US009762563B2

United States Patent
Davis et al.

(10) Patent No.: US 9,762,563 B2
(45) Date of Patent: *Sep. 12, 2017

(54) RESOURCE ACCESS SYSTEM AND METHOD

(71) Applicant: FullArmor Corporation, Boston, MA (US)

(72) Inventors: Charles A. Davis, Sugar Land, TX (US); Danny Kim, San Jose, CA (US); Michael Hilton Manlief, Lexington, MA (US); Matthew Randall Sousley, Cashmere, WA (US)

(73) Assignee: FullArmor Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/883,032

(22) Filed: Oct. 14, 2015

(65) Prior Publication Data

US 2017/0111336 A1    Apr. 20, 2017

(51) Int. Cl.
*G06F 21/00* (2013.01)
*H04L 29/06* (2006.01)
*H04L 29/12* (2006.01)
*H04L 29/08* (2006.01)

(52) U.S. Cl.
CPC .......... *H04L 63/08* (2013.01); *H04L 61/2571* (2013.01); *H04L 63/029* (2013.01); *H04L 67/02* (2013.01)

(58) Field of Classification Search
None
See application file for complete search history.

(56) References Cited

U.S. PATENT DOCUMENTS

| 5,815,574 | A  | 9/1998  | Fortinsky |
| 6,055,637 | A  | 4/2000  | Hudson et al. |
| 6,088,451 | A  | 7/2000  | He et al. |
| 6,279,111 | B1 | 8/2001  | Jensenworth et al. |
| 6,480,915 | B1 | 11/2002 | Arimilli et al. |

(Continued)

OTHER PUBLICATIONS

"U.S. Appl. No. 14/882,988, Non Final Office Action mailed Mar. 3, 2016", 43 pgs.

(Continued)

*Primary Examiner* — Maung Lwin
(74) *Attorney, Agent, or Firm* — Schwegman Lundberg & Woessner, P.A.

(57) ABSTRACT

A system for enabling an endpoint residing in an external network to perform resource operations on an internal resource, the system including a directory service managing authentication and authorization operations for the internal resource, a gatekeeper device residing in the external network, and a gateway device residing in an internal network. The gatekeeper device is configured to receive a resource operation request from the endpoint, the resource operation request is associated with a user and transmit the resource operation request to the gateway device. The gateway device is configured to receive the resource operation request from the gatekeeper device, authenticate with the directory service as the user, using credentials of the user, authorize the resource operation request with the directory service, and initiate the resource operation request with the internal resource.

19 Claims, 13 Drawing Sheets

(56) References Cited

U.S. PATENT DOCUMENTS

| | | |
|---|---|---|
| 6,553,442 B1 | 4/2003 | Arimilli et al. |
| 6,643,774 B1 | 11/2003 | McGarvey |
| 6,985,953 B1 | 1/2006 | Sandhu et al. |
| 7,010,600 B1* | 3/2006 | Prasad .................. H04L 63/102 709/223 |
| 7,130,066 B1* | 10/2006 | Kanematu ............. H04L 63/083 358/1.14 |
| 7,366,900 B2 | 4/2008 | Shambroom |
| 7,376,827 B1 | 5/2008 | Jiao |
| 7,401,235 B2 | 7/2008 | Mowers et al. |
| 7,797,737 B2* | 9/2010 | Eibach .................... B60R 25/00 726/11 |
| 7,886,341 B2 | 2/2011 | Lin et al. |
| 8,010,679 B2* | 8/2011 | Low ...................... G06F 3/1415 709/217 |
| 8,108,921 B2 | 1/2012 | Shin et al. |
| 8,132,242 B1 | 3/2012 | Wu |
| 8,250,640 B1 | 8/2012 | Zhang et al. |
| 8,255,984 B1 | 8/2012 | Ghostine et al. |
| 8,613,070 B1 | 12/2013 | Borzycki et al. |
| 8,631,050 B1 | 1/2014 | Gayle |
| 8,700,892 B2 | 4/2014 | Bollay et al. |
| 8,745,718 B1 | 6/2014 | Dufel et al. |
| 9,286,465 B1 | 3/2016 | Jain |
| 9,386,006 B1 | 7/2016 | Maldaner et al. |
| 9,450,944 B1* | 9/2016 | Sousley .................. H04L 67/02 |
| 9,509,684 B1 | 11/2016 | Dixson-Boles et al. |
| 2001/0056550 A1* | 12/2001 | Lee ....................... H04L 63/083 726/11 |
| 2002/0046170 A1 | 4/2002 | Gvily |
| 2002/0049912 A1 | 4/2002 | Honjo et al. |
| 2002/0112186 A1 | 8/2002 | Ford et al. |
| 2002/0150253 A1 | 10/2002 | Brezak et al. |
| 2003/0018913 A1 | 1/2003 | Brezak et al. |
| 2003/0061512 A1 | 3/2003 | Flurry et al. |
| 2003/0065917 A1 | 4/2003 | Medvinsky et al. |
| 2003/0070068 A1 | 4/2003 | Medvinsky |
| 2003/0093690 A1* | 5/2003 | Kemper .................. G06F 21/31 726/5 |
| 2003/0120948 A1 | 6/2003 | Schmidt et al. |
| 2003/0149871 A1 | 8/2003 | Medvinsky |
| 2003/0200465 A1 | 10/2003 | Bhat et al. |
| 2003/0212806 A1 | 11/2003 | Mowers et al. |
| 2004/0003190 A1 | 1/2004 | Childs et al. |
| 2004/0003287 A1 | 1/2004 | Zissimopoulos et al. |
| 2004/0010620 A1 | 1/2004 | Salo et al. |
| 2004/0093515 A1 | 5/2004 | Reeves, Jr. |
| 2004/0123144 A1 | 6/2004 | Chan et al. |
| 2004/0128499 A1 | 7/2004 | Peterka et al. |
| 2004/0128546 A1 | 7/2004 | Blakley, III et al. |
| 2004/0162997 A1* | 8/2004 | Hopmann ............ G06F 21/6218 713/154 |
| 2004/0167465 A1 | 8/2004 | Mihai et al. |
| 2004/0167804 A1 | 8/2004 | Simpson et al. |
| 2004/0167984 A1 | 8/2004 | Herrmann |
| 2004/0172222 A1 | 9/2004 | Simpson et al. |
| 2004/0172300 A1 | 9/2004 | Mihai et al. |
| 2004/0172301 A1 | 9/2004 | Mihai et al. |
| 2004/0172302 A1 | 9/2004 | Martucci et al. |
| 2004/0260942 A1* | 12/2004 | Jamieson ................ G06F 21/41 726/8 |
| 2004/0267670 A1 | 12/2004 | Minyailov |
| 2004/0268145 A1* | 12/2004 | Watkins .................. G06F 21/57 726/24 |
| 2005/0055242 A1 | 3/2005 | Bello et al. |
| 2005/0055244 A1 | 3/2005 | Mullan et al. |
| 2005/0065817 A1 | 3/2005 | Mihai et al. |
| 2005/0091171 A1 | 4/2005 | Grobman |
| 2005/0116030 A1 | 6/2005 | Wada et al. |
| 2005/0119941 A1 | 6/2005 | James |
| 2005/0125677 A1 | 6/2005 | Michaelides |
| 2005/0138192 A1* | 6/2005 | Encarnacion ....... H04L 12/2812 709/230 |
| 2005/0278441 A1* | 12/2005 | Bond .................... G06F 9/5027 709/223 |
| 2006/0174037 A1 | 8/2006 | Bernardi et al. |
| 2006/0182100 A1* | 8/2006 | Li ...................... H04L 29/12009 370/389 |
| 2006/0193467 A1* | 8/2006 | Levin .................. G06F 21/6218 379/413.04 |
| 2007/0006291 A1 | 1/2007 | Barari et al. |
| 2007/0130167 A1 | 6/2007 | Day et al. |
| 2007/0180493 A1* | 8/2007 | Croft .................... G06F 3/1415 726/2 |
| 2007/0186106 A1 | 8/2007 | Ting et al. |
| 2007/0220154 A1 | 9/2007 | El Husseini et al. |
| 2008/0052775 A1 | 2/2008 | Sandhu et al. |
| 2008/0077809 A1 | 3/2008 | Hayler et al. |
| 2008/0104661 A1* | 5/2008 | Levin .................. G06F 21/6218 726/1 |
| 2008/0134311 A1 | 6/2008 | Medvinsky et al. |
| 2008/0175393 A1 | 7/2008 | Oba et al. |
| 2008/0178277 A1 | 7/2008 | Oba et al. |
| 2008/0212783 A1 | 9/2008 | Oba |
| 2008/0263640 A1 | 10/2008 | Brown |
| 2009/0144021 A1 | 6/2009 | Ketskes |
| 2009/0158392 A1* | 6/2009 | Hughes .................... H04L 63/08 726/3 |
| 2009/0178129 A1 | 7/2009 | Cross et al. |
| 2009/0205042 A1 | 8/2009 | Zhou et al. |
| 2009/0235349 A1 | 9/2009 | Lai et al. |
| 2009/0251529 A1* | 10/2009 | Tucker ................ H04L 12/1827 348/14.09 |
| 2009/0254670 A1* | 10/2009 | Kim ...................... H04L 67/02 709/230 |
| 2009/0254750 A1 | 10/2009 | Bono et al. |
| 2009/0254926 A1 | 10/2009 | Kim et al. |
| 2009/0260072 A1 | 10/2009 | Rouskov et al. |
| 2009/0271634 A1 | 10/2009 | Boult et al. |
| 2009/0292927 A1 | 11/2009 | Wenzel et al. |
| 2010/0082979 A1 | 4/2010 | Edwards |
| 2010/0094978 A1* | 4/2010 | Runeson ............ H04L 29/12367 709/221 |
| 2010/0315225 A1 | 12/2010 | Teague |
| 2011/0213965 A1 | 9/2011 | Fu et al. |
| 2011/0265166 A1 | 10/2011 | Franco et al. |
| 2011/0265172 A1 | 10/2011 | Sharma et al. |
| 2011/0307947 A1 | 12/2011 | Kariv et al. |
| 2011/0313774 A1 | 12/2011 | Ji et al. |
| 2011/0314533 A1 | 12/2011 | Austin et al. |
| 2012/0009676 A1 | 1/2012 | Mack |
| 2012/0017271 A1 | 1/2012 | Smith et al. |
| 2012/0023377 A1 | 1/2012 | Garskof |
| 2012/0023568 A1 | 1/2012 | Cha et al. |
| 2012/0030229 A1 | 2/2012 | Ji et al. |
| 2012/0069385 A1* | 3/2012 | Von Hatten ............ G06F 3/1203 358/1.15 |
| 2012/0096272 A1* | 4/2012 | Jasper .................. H04L 63/0853 713/176 |
| 2012/0109676 A1 | 5/2012 | Landau |
| 2012/0122430 A1 | 5/2012 | Hutchings et al. |
| 2013/0185784 A1 | 7/2013 | Tamura |
| 2013/0191631 A1 | 7/2013 | Ylonen et al. |
| 2013/0212653 A1 | 8/2013 | Hoghaug |
| 2013/0227291 A1 | 8/2013 | Ahmed et al. |
| 2014/0164251 A1 | 6/2014 | Loh |
| 2014/0281496 A1 | 9/2014 | Bent et al. |
| 2014/0331297 A1 | 11/2014 | Innes et al. |
| 2014/0366080 A1 | 12/2014 | Gupta et al. |
| 2015/0127946 A1 | 5/2015 | Miller et al. |
| 2015/0237049 A1 | 8/2015 | Grajek et al. |
| 2015/0244706 A1 | 8/2015 | Grajek et al. |
| 2015/0312038 A1 | 10/2015 | Palanisamy |
| 2015/0319171 A1 | 11/2015 | Robison et al. |
| 2015/0319174 A1 | 11/2015 | Hayton et al. |
| 2016/0028718 A1 | 1/2016 | Hayashi |
| 2016/0044035 A1 | 2/2016 | Huang |
| 2016/0065565 A1 | 3/2016 | Plotnik et al. |
| 2016/0127352 A1 | 5/2016 | Xu et al. |

(56) References Cited

U.S. PATENT DOCUMENTS

2016/0205108 A1* 7/2016 Si .................. H04L 63/102
                                                    726/4

OTHER PUBLICATIONS

"U.S. Appl. No. 14/883,017, Non Final Office Action mailed Apr. 26, 2016", 13 pgs.
"U.S. Appl. No. 14/882,988, Examiner Interview Summary mailed Apr. 26, 2016", 3 pgs.
"U.S. Appl. No. 14/882,988, Notice of Allowance mailed Jul. 24, 2016", 20 pgs.
"U.S. Appl. No. 14/882,988, Response filed Jun. 3, 2016 to Non Final Office Action mailed Mar. 3, 2016", 20 pgs.
"U.S. Appl. No. 14/883,017, Examiner Interview Summary mailed Aug. 16, 2016", 3 pgs.
"U.S. Appl. No. 14/883,017, Notice of Allowance mailed Oct. 11, 2016", 15 pgs.
"U.S. Appl. No. 14/883,017, Response filed Jul. 26, 2016 to Non Final Office Action mailed Apr. 26, 2016", 12 pgs.
Botero, Oscar, et al., "Platform and experimentation of secure service location with P2P/Client-Server over ad hoc networks", 2nd IFIP Wireless Days, (2009), 1-5 pgs.

* cited by examiner

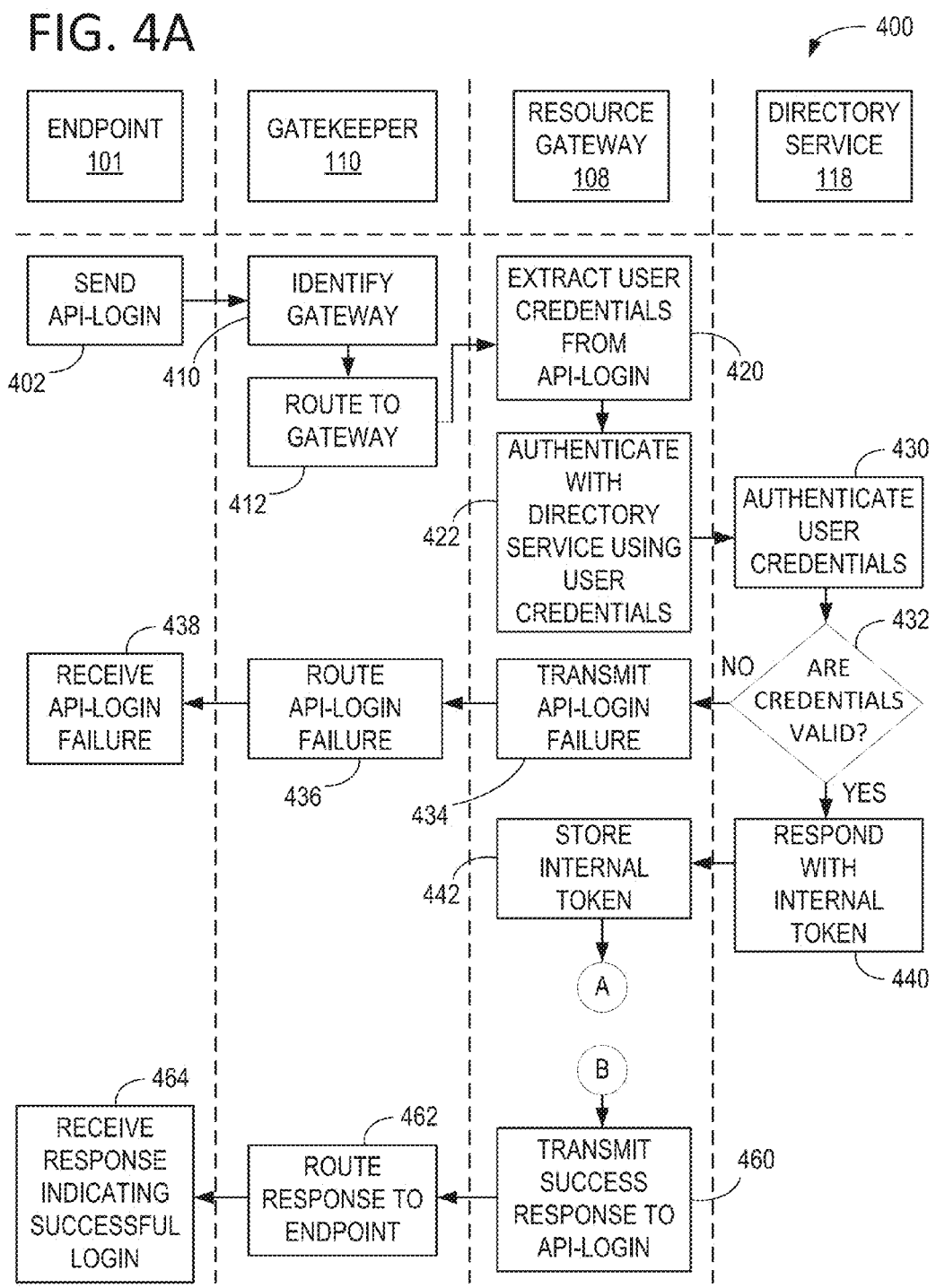

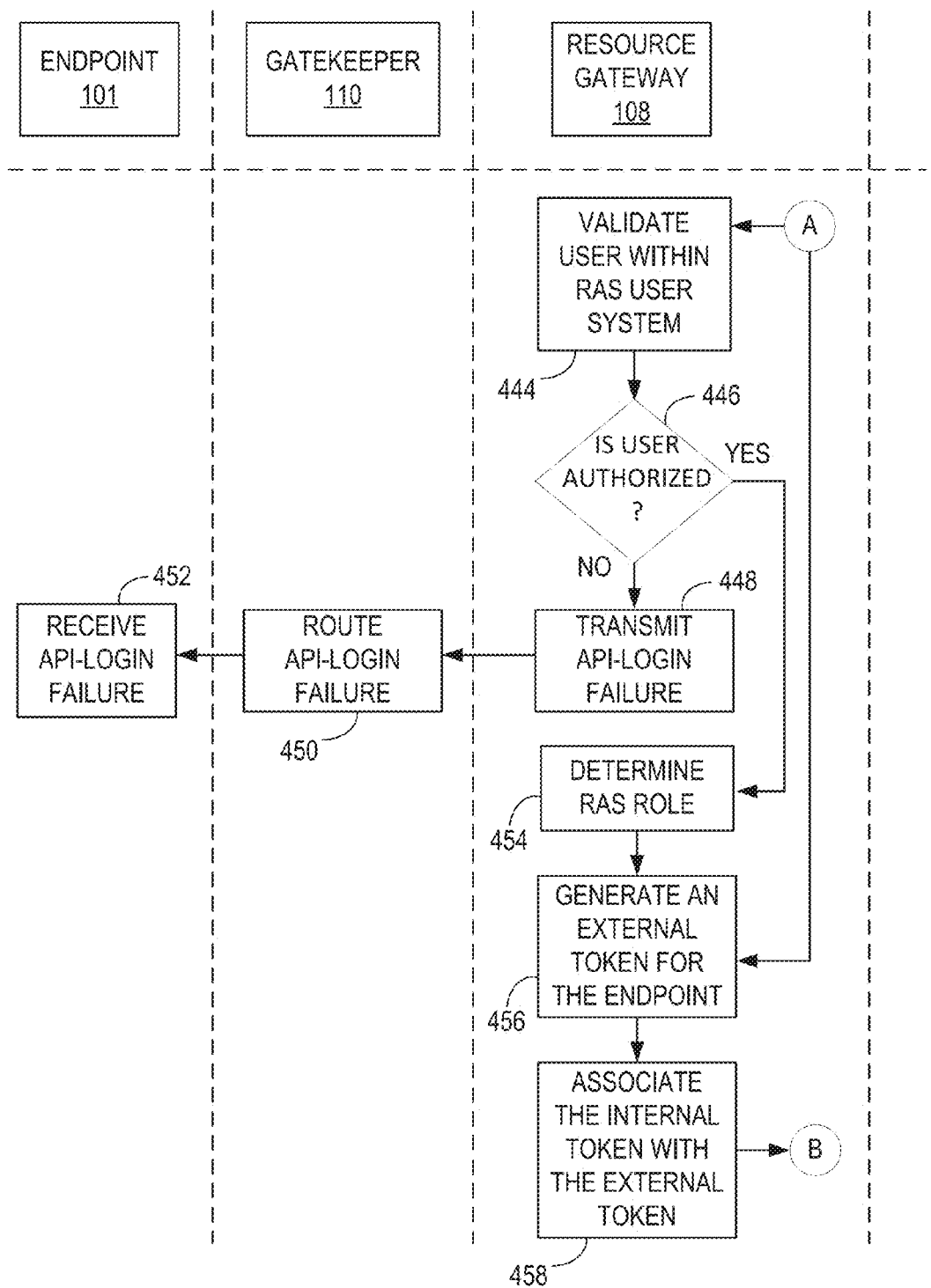

RESOURCE ACCESS SYSTEM AND METHOD

TECHNICAL FIELD

Embodiments of the present disclosure relate generally to enterprise computing resources and, more particularly, but not by way of limitation, to a resource access system, method, and networking protocols for enabling external network access to enterprise computing resources residing in an internal network.

BACKGROUND

Computing resources, such as file servers, printers, intranet devices, and email servers live in a secure corporate network (e.g., a corporation's enterprise "intranet," or internal network) that may be managed via a directory service such as ACTIVE DIRECTORY® ("AD") (Microsoft Corporation, Redmond Wash.). Some directory services such as AD handle resource discovery, authentication, and management of enterprise computing resources and users. Cloud services and cloud connected mobile devices that run outside the corporate network have limited options on ways to connect back into an internal premise domain. Currently, the most common way to do this is via a Virtual Private Network (VPN) setup between the cloud service or client that is outside the network and an internal gateway server inside the corporate network. A VPN allows two services to communicate via a single dedicated tunnel.

BRIEF DESCRIPTION OF THE DRAWINGS

To easily identify the discussion of any particular element or act, the most significant digit or digits in a reference number refer to the figure number in which that element is first introduced. Further, like numbers indicate like components.

FIG. 4A is a swimlane flowchart of a login process for pass-through authentication of the requesting user (e.g., the user of the endpoint) within the Resource Access System shown in FIG. 1.

FIG. 4B is a swimlane flowchart illustrating additional process operations that may be performed by the gateway as a part of the pass-through authentication process shown in FIG. 4A.

DETAILED DESCRIPTION

Glossary

Figure 1:
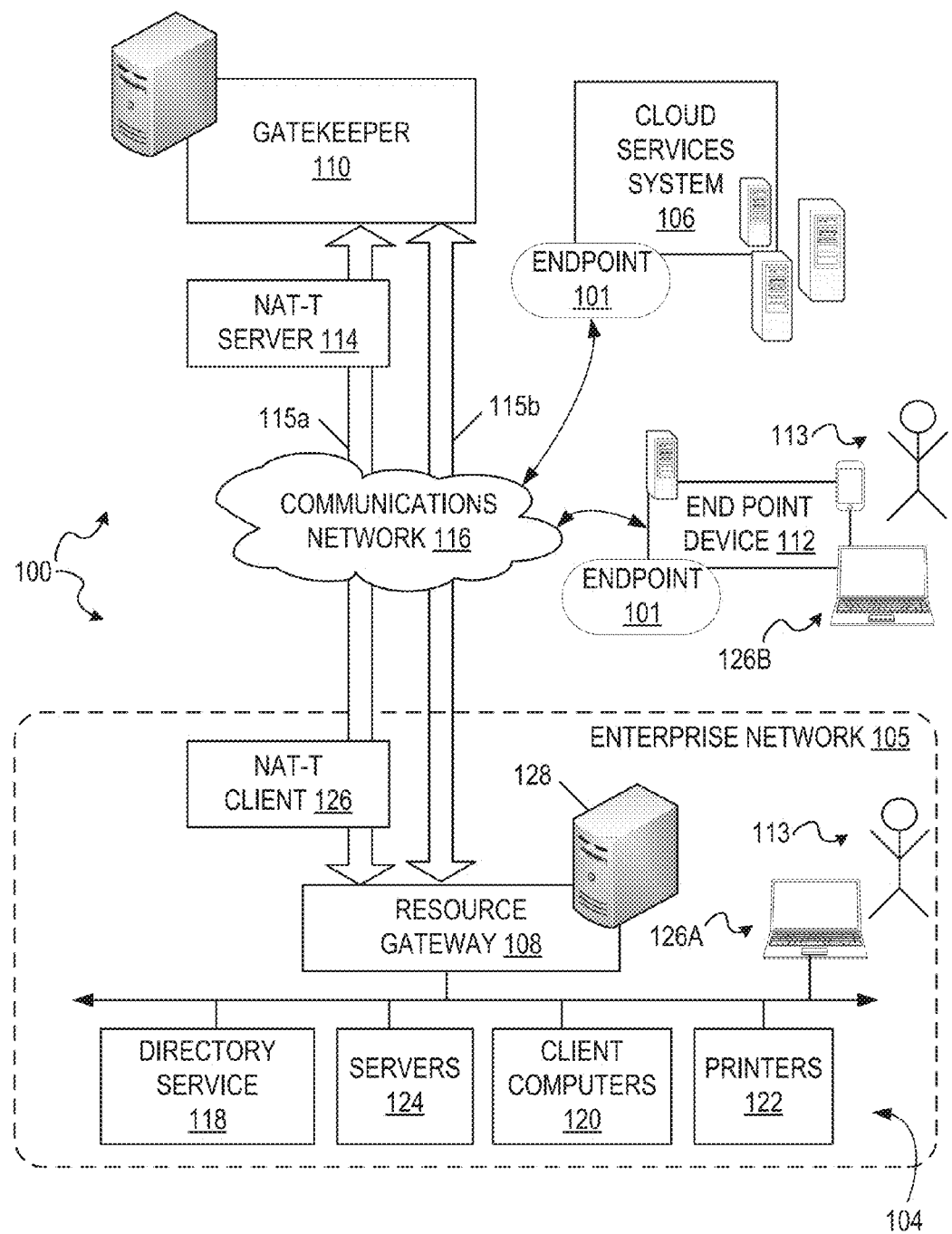
FIG. 1 is a network diagram depicting an example Resource Access System ("RAS") that enables external computing devices to access internal computing resources.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MODULE" in this context refers to logic having boundaries defined by function or subroutine calls, branch points, application program interfaces (APIs), or other technologies that provide for the partitioning or modularization of particular processing or control functions. Modules are typically combined via their interfaces with other modules to carry out a machine process. A module may be a packaged functional hardware unit designed for use with other components and a part of a program that usually performs a particular function of related functions. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" (or "hardware-implemented module") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors. Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

"GATEWAY" in this context refers to a computing device, application, or system that performs operations as described herein, and not strictly operations associated with typical network gateways. Typical network gateways enable the passing of network traffic between multiple networks, sometimes performing network protocol conversion or translation between two different protocols. Typical proxy devices, applications, or systems act as an agent, or a substitute actor for performing an operation on behalf of another. The term gateway, as used herein, is not meant to limit the operations of the described devices, applications, or systems to that of a typical network gateway. Rather, the gateways described herein may perform operations similar to network gateways, proxies, or any other operations as described herein.

Description

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

There are multiple limitations to known approaches when dealing with cloud services and remote computing resources, such as the need for lightweight connection pooling and dynamic switching, and the heavy requirements on the client and server sides for specialized software and handshake in order to orchestrate a secure connection. Known Virtual Private Network (VPN) solutions often require dedicated hardware, where connections for each user may be opened and maintained even when not actively in use. Because cloud services are transient and often require minimal prerequisites, there is a need for a mechanism that can address the dynamic nature of a secure cloud to on-premise connection and resource sharing along with the minimal infrastructure requirements of being accessible via a simple web browser, heterogeneous cloud connected mobile device or via well-established web based APIs.

Further, in some situations, users may work around the limitations of known systems. For example, a user wanting to access files on their intranet may copy their files to an external environment, such as an Internet-based file hosting service, in order to have access to their files while outside the enterprise intranet. This practice is sometimes referred to as "shadow IT," where users become their own Information Technology (IT) department by employing alternate systems, solutions, or applications that circumvent architectural or security limitations of their existing enterprise IT systems. These unsanctioned workarounds can cause many problems such as security issues (e.g., unauthorized access to the data, data breach), data control issues (e.g., inability for the business entity to revoke access to the data for terminated employees), and version control issues (e.g., no synchronization between the multiple copies), to name but a few. If users had sufficient access to the internal resources, such problems could be avoided.

A Resource Access System, method, and associated protocols are described herein for addressing these technical problems by providing external network-based access to computing resources within a protected network (e.g., internal servers or systems within an intranet network of a business entity). In other words, and for example, the Resource Access System enables computing devices outside of an enterprise network (e.g., Internet-based devices such as users' smartphones or remote computing devices) to access internal computing resources ("intranet components" or "on-premise resources") within the enterprise network. The enterprise environment may provide many internal computing resources, components, or systems, to its employees. These intranet components may, for example, be managed by a directory service such as ACTIVE DIRECTORY® ("AD") (Microsoft Corporation, Redmond Wash.). An AD domain controller provides authentication and authorization services for users of the network (e.g., employees), such as providing username and password authentication for internal servers, personal computers, and other intranet computing resources.

For example, an employee (e.g., the "user") may have access to their own personal share (e.g., directory of files, the internal resource or component), or a database-driven application accessing an internal database resource, when logged into their work computer on the enterprise intranet. As such, the user may authenticate and authorize use of the internal resource (e.g., their share, or the internal database) through an AD domain controller, also within the intranet network. However, AD services may be inhibited for devices and/or applications outside of that enterprise's intranet, and perhaps for some device types not typically joined to the directory service (e.g., smartphones, tablets), making remote access to directory services unavailable or unusable to those devices. Further, enterprise application ("app") developers may wish to leverage the advantages of Internet cloud-based app deployment (e.g., lower cost, greater scalability, externally accessible) when developing new apps, or may wish to migrate existing non-cloud-based apps to the cloud. As such, the business entity may develop cloud-based apps for use by the employee while remote (e.g., when the user is away from the business premises, such as via an Internet-based cloud service). Accordingly, it may be advantageous to provide access to the internal computing resource through the external app and/or to the external or "endpoint" device (e.g., access to the employee's share on the employee's mobile device). The term "endpoint" is used herein, for purposes of convenience, to refer to the external application and/or the external device (e.g., from the Internet) which is to be the consumer of the internal computing resources (i.e., to which access is sought) through the Resource Access System described herein.

The Resource Access System ("RAS") performs pass-through authentication and impersonation provide external access to internal computing resources of the enterprise. In some example embodiments, the RAS includes at least two devices: a gatekeeper and a resource gateway (or just "gateway"). The gatekeeper acts as the first point of contact for the endpoint when initiating access to the internal resource(s), and in some embodiments, a router for subsequent traffic from the endpoint to the resource gateway. The gatekeeper resides within the external cloud or other eternal network (e.g., the Internet) and has network connectivity to endpoint devices of the users or external applications such as the cloud apps. Further, the gatekeeper has network connection capability enabled to the resource gateway, which resides in the internal network (e.g., the intranet), as well as perhaps other resource gateways (e.g., each supporting different domains, or different intranets). For incoming API requests, the gatekeeper determines which resource gateway is the target of the API request and forwards the API request accordingly. As such, the gatekeeper is able to support multiple resource gateways.

The resource gateway acts on behalf of the endpoint to facilitate access to internal resources, such as AD domain servers, server systems, databases, file shares, and so forth. The resource gateway provides access to internal resources for the endpoint. To initiate this access, the endpoint submits resource requests through to the resource gateway in the form of API calls passed to the gatekeeper and/or the resource gateway (e.g., as Representational State Transfer (REST) API calls via Hypertext Transfer Protocol (HTTP/S), and optionally JavaScript Object Notation (JSON) messages). More specifically, when the endpoint initiates resource request operations (e.g., via API calls), the resource gateway authenticates with an internal directory service (e.g., an AD domain controller) as the user (e.g., with credentials of the user), in order to access the internal resources on behalf of the external endpoint. In other words, the resource gateway pretends to be the user in order to perform access request operations to the internal resource, similar to how the user would were they connected to the intranet and authenticating with the directory service directly. As such, the resource gateway appears to the AD domain server to be the user, and the internal directory service responds to the operations submitted by the gateway as such.

To enable endpoint communication with the gateway, in some embodiments, the endpoint includes an API client configured with a suite of application program interface ("API") commands for various resource types (e.g., printers, file shares, databases, and so forth), and for various resource requests (e.g., different operations for the given resource type). The API commands, or "API calls," serve as a message submission format through which the endpoint or app may initiate requests for access to the internal resources. In other words, each type of internal resource may have a set of API calls defined, where each API call defines a particular operation appropriate for that internal resource.

To perform resource operations on behalf of the external user, the gateway includes one or more "resource controllers" for the various types of internal resources supported by the gateway. For example, the gateway may include a database controller (e.g., for performing operations with internal databases), a share controller (e.g., for performing file-level operations with users' shares), a printer controller, and so forth. Each of these controllers is customized to perform one or more resource operations with the associated resource type (e.g., as also defined by the API operations for that resource type). Each of the API operations includes a "resource type" and a "resource operation" (as well as additional operational parameters), where the resource type may be used to identify a particular controller, and where that particular controller is configured to perform each of the various resource operations for that resource type. For purposes of discussion, the nomenclature used herein to identify particular operations is "API-<resource type>-<resource operation>", where <resource type> identifies the resource type (and associated controller), and where <resource operation> identifies the operation to be performed (e.g., on a resource of that <resource type>). For example, the operation "API-share-download" indicates a "download" operation on a "share" type resource (e.g., downloading a file from a particular share).

In some embodiments, the Resource Access System provides a user administration system (RAS user system) that brokers various access controls, such as which users will have access to the internal computing resources from the external network. The RAS user system acts as an access control mechanism through which administrators can define or configure which operations may be performed by particular users through the Resource Access System (e.g., from the external network). This extra resource control mechanism acts in addition to, and beside, the resource privileges already afforded through the native AD domain controllers. In other words, even though a user may be privileged to access a particular database resource while on the internal network, the user administration module may prohibit that same user from accessing the database resource from the external network (e.g., for security concerns). The user administration module includes a set of user roles to which each user may be assigned, as well as resource privilege assignments for each user.

FIG. 1 is a network diagram depicting an example Resource Access System ("RAS") 100 that enables external computing devices to access internal computing resources. More specifically, the Resource Access System 100 enables external endpoints 101, such as endpoint device 112 or external applications (not separately shown but, e.g., running on a cloud services system 106), which are connected to an external communications network 116 (e.g., the Internet), to access internal computing resources 104 within a protected, private, or internal network, such as an enterprise network 105 (e.g., an intranet network of a business entity).

For example, a user 113 may be an employee of the business entity to which the enterprise network 105 belongs. During the user's 113 normal work day, the user 113 may operate on a computing device that is directly connected to the enterprise network, such as a desktop device or a mobile device 126A such as a laptop computer. In other words, the device 126A is an internal device that can directly access the directory service 118 for authentication and authorization services (e.g., for accessing other internal computing resources 104) without requiring the resource gateway 108. For example, the user 113 may access a share on a fileserver (e.g., a server 124) to access the marketing department files, and the directory service 118 may authenticate and authorize such access operations directly with the internal device 126A.

The user 113 may also desire to access the internal computing resources 104 from outside the enterprise network 105 (e.g., externally). For example, the user 113 may have need to access the marketing department files during an evening or weekend when the user 113 is not at work (e.g., not directly attached to the enterprise network 105). The Resource Access System 100 described herein enables the user 113 and/or the endpoint 101 to access the internal computing resources 104 from the external communications network 116.

To enable such access, the Resource Access System 100 includes a resource gateway 108 and a gatekeeper 110. The gateway 108 resides within the enterprise network 105 (e.g., internally), and the gatekeeper 110 resides in the external communications network 116 (e.g., externally). The gateway 108 and the gatekeeper 110 communicate with each other and/or the endpoints (e.g., endpoint device 112) over the external communications network 116. The enterprise network 105 may be separated from the communications network 116 by one or more perimeter devices (not separately shown), such as a firewall device (e.g., a device that prohibits some network traffic but allows other traffic). Further, the enterprise network 105 may use private networking addresses, such as non-routing Internet Protocol (IP) address ranges. As such, the internal computing resources 104 may not be directly accessible to the endpoints. In the example embodiment, the gatekeeper 110 operates as a cloud component 102 (e.g., as a service running on the cloud services system 106), and the resource gateway 108 operates on an internal server 128. However, the gatekeeper 110 and resource gateway 108 may operate in any software- or hardware-based architecture that enables the systems and methods described herein.

In the example embodiment, the gatekeeper 110 communicates with the resource gateway 108 through communications paths ("NAT path") 115A that leverage network address translation ("NAT") traversal. The Resource Access System 100 includes a NAT-T Server 114 and a NAT-T Client 126 that communicate with each other over the communications network 116. The NAT-T Client 126 opens a persistent set of SSL connections to the NAT-T Server 114, generally represented in FIG. 1 as the NAT path 115A. During operation, the NAT-T Client 126 and/or NAT-T Server 114 may transact communications with each other over the NAT path 115A. The NAT path 115A may enable the gatekeeper 110 to communicate with the gateway 108 and avoid some of the network architecture limitations that may be present in the enterprise network 105. For example, the NAT path 115A may enable the gatekeeper 110 to communicate with the gateway 108 when the gateway 108 may not use port forwarding, or may not be located in a "DMZ" subnetwork within the enterprise network 105. In some embodiments, the Resource Access System 100 may additionally, or alternatively, include a non-NAT path, or direct communications path ("direct path") 115B between the gatekeeper 110 and the gateway 108. The NAT-T Server 114 and/or the NAT-T Client 126 may open direct HTTPS connections with each other. For example, if the network architecture of the enterprise network 105 allows the gatekeeper 110 to directly open TCP/IP connections with the gateway 108, then the gatekeeper 110 may open an encrypted connection directly with the gateway 108 (e.g., as needed).

The internal computing resources 104 are managed by a directory service 118, such as ACTIVE DIRECTORY® ("AD") DOMAIN SERVICES ("AD DS") (which may also be referred to herein as an internal computing resource). Each particular type of directory service 118 may manage authentication and authorization operations differently. For example, the directory services 118 may be Lightweight Directory Access Protocol ("LDAP"), an industry standard application protocol for accessing and maintaining distributed directory information services over IP networks, or an LDAP-based, or Kerberos-based directory service similar to AD (e.g., providing similar authentication or authorization services), such as Oracle® Internet Directory ("OID"), OpenLDAP, or eDirectory. For example, LDAP authentication may performed using a "bind" operation (e.g., providing a fully qualified domain name of the user and the user's password) to the LDAP service (e.g., the directory service 112) using X.500 protocol. Other directory services that provide similar operations as described herein may be supported by the Resource Access System 100 as the directory service 118. Further, multiple types of directory services 118 may be supported individually or concurrently by the Resource Access System 100.

In the example embodiment, the directory service 118 provides user authentication and authorization operations for users such as user 113 and computing resources on the enterprise network 105, including the internal computing resources 104, as well as external endpoints such as endpoint device 112 and endpoint applications. As is generally known in the art, authentication may include a process for verifying who a particular computing actor is, or whether a particular computing actor is who they say they are. For example, an actor or entity may provide credentials such as a login name and password and, using that information, the directory service may compare the provided login name and password with a directory of known users. If the login name is found and the provided password matches the password stored for that user, authentication is completed successfully (e.g., the actor is authenticated as that user). Further, as is generally known in the art, authorization may include a process for verifying whether a particular computing actor (e.g., the authenticated user) is privileged to access a particular computing resource. In other words, while the user may be who they say they are (e.g., properly authenticated), that user may or may not be privileged to access the particular computing resource. For example, the requesting user may attempt to read a file on a share configured for all of the users in the "marketing department" for an enterprise. As such, authentication may include determining whether the requesting user is in a marketing department group of users within the directory service.

The endpoint 101 includes an application that initiates resource operation requests for the internal computing resources 104 through the Resource Access System 100. The requesting application may be a user-level software application, a cloud-based application, a middleware application, an operating system-level application, a database system, or a hardware-based implementation. Further, the endpoint 101 may be provided by an endpoint device 112, such as a server computing device or a personal computing device of the user 113 (e.g., external device 126B), or by the cloud services system 106 (e.g., as a software-as-a-service application). In the example embodiment, the endpoint 101 does not have direct access to the directory service 118 and/or the internal computing resources 104 (e.g., because of networking constraints) and, as such, engages the Resource Access System 100 to access the internal computing resources 104. As used herein, the term "endpoint" may be used interchangeably to refer to the requesting application, or to the computing device hosting the requesting application, or both.

During operation, the Resource Access System 100 receives resource requests (or "resource operation requests") from the endpoints 101. The gatekeeper 110 forwards the resource requests to the gateway 108 (e.g., through the NAT-T server 114 and client 126). The resource gateway 108 processes the operations requests with the internal resources 104 on behalf of the endpoint 101 and transmits operations responses back to the gatekeeper, and back through to the endpoint 101. The resource operations requests and operations performed by the gateway 108 and other internal resources 104 are described in greater detail below.

Figure 2:
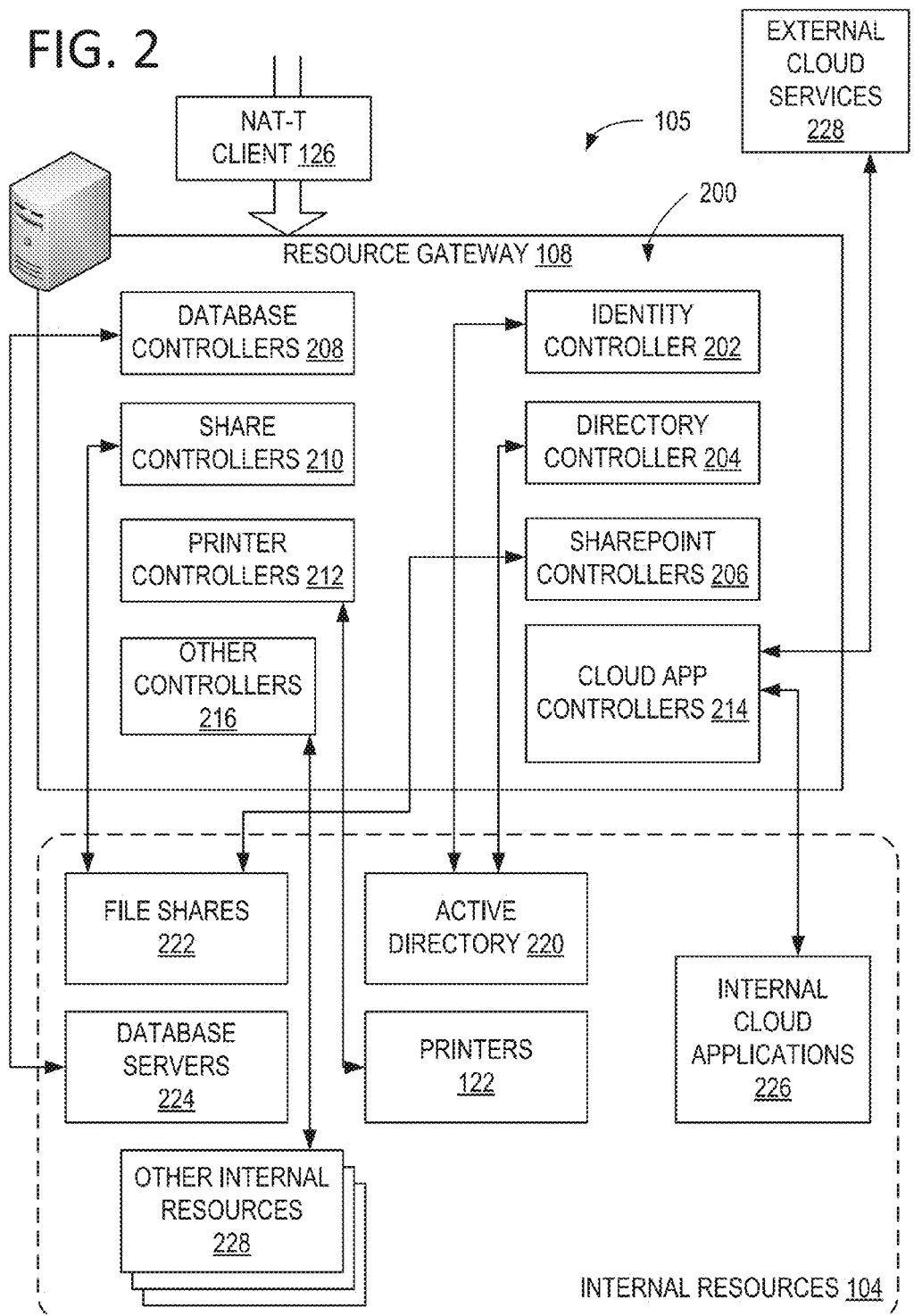
FIG. 2 is a more detailed block diagram of the enterprise network shown in FIG. 1.

FIG. 2 is a more detailed block diagram of the enterprise network 105 shown in FIG. 1. In the example embodiment, the resource gateway 108 includes an identity controller 202, a directory controller 204, a SHAREPOINT controller(s) 206, a database controller(s) 208, a share controller(s) 210, a printer controller(s) 212, and other controller(s) 216 (all collectively referred to herein as resource controllers 200). The enterprise network 105 includes a directory service 118 such as active directory 220 (e.g., one or more AD domain controllers), file shares 222, database server(s) 224, internal cloud applications 226, printer(s) 122, and other internal computing resources 228 (all collectively referred to herein as internal resources 104).

The identity controller 202 is a central controller 200 for the resource gateway 108 that manages interactions with the gatekeeper 110 (e.g., initially processing incoming resource requests and transmitting outgoing responses), as well as provides certain authentication and authorization operations with active directory 220. Authentication operations are described in greater detail below, particularly in respect to FIGS. 3, 4A, and 4B. Authorization operations are described in greater detail below, particularly in respect to FIG. 5.

Each of the controllers 200 are associated with one or more particular type(s) of resource (e.g., Oracle® databases, or Windows® network shares, or third-party applications), or one or more particular internal resource(s) (e.g., the printer named "MarketingPTR"), and each are configured to perform one or more resource operations on the associated resource (e.g., perform database queries, or access files, or submit a print request). Each particular internal resource 104 has one or more resource operations that may be performed by the resource gateway 108 on behalf of the endpoint 101. Further, some of the internal resources 104 are managed in some respect by the directory service 118 (e.g., active directory 220), for example, for authentication and/or authorization services. Some of the internal resources 104 may not be directly managed by the directory service 118, and may include their own dedicated directory service. For example, some database servers 224 may provide their own directory services for authentication and/or authorization of user access requests. The Resource Access System 100 may support either or both types of internal resources 104, those managed by a separate directory service such as AD 220, and those managed by a dedicated directory service, in each case still providing external access to the endpoints 101 for the internal resource 104.

In the example embodiment, the directory controller 204 interacts with active directory 220 to perform directory services resource operations (e.g., AD DS) such as file share access, application access, authorization services, user, group, and resource inquiries and changes, and such. Authorization services are described in greater detail below with respect to FIG. 5. The SharePoint controller 206 interacts with file shares 222 to perform SharePoint resource operations to particular resources (e.g., managed by a particular SharePoint server, not separately shown). For example, the directory controller 204 may initially authorize access to the particular SharePoint server for the user 113, then pass the resource operation request on to the SharePoint Controller 206, which then interacts with the SharePoint server to provide authorization for operation request of the user 113 for that particular resource (e.g., which may subsequently involve a callback from the SharePoint server to AD 220 for authorization of the user 113 to the requested resource).

The database controller 208 interacts with database servers 224 to perform database resource operations such as reading, modifying, writing, deleting, or otherwise updating data to database servers 224. The resource gateway 108 may include separate database controllers 208 for different vendors' databases (e.g., one controller 208 for Oracle® databases, and another controller 208 for IBM® DB2 databases), or for different versions of databases (e.g., one controller 208 for Oracle® version 10x, and another controller 208 for Oracle® version 11x), or for particular databases (e.g., one controller 208 for the database 224 named "MarketingDB", and another controller 208 for the database 224 named "ResearchDB"). Further, as mentioned above, some database servers 224 may include their own directory service (e.g., for managing authentication and/or authorization). As such, the database controller 208, or the identity controller 202, may additionally manage authentication and/or authorization operations with the database servers 224 directly, rather than, or in addition to, the authentication and/or authorization operations conducted with the directory service 118.

The share controller 210 interacts with file shares 222 to perform share resource operations such as, for example, file creation, read access, write access, and delete operations, and directory and file management operations. The printer controller 212 interacts with printers 122 to perform printer resource operations.

The cloud app controller 214 interacts with internal cloud applications 226 or external resources such as external cloud services 228 (e.g., $3^{rd}$ party apps) to perform various application operations. External resources may include cloud services such as OFFICE 365® (Microsoft Corporation, Redmond Wash.), DROPBOX® (DropBox Inc., a Delaware Corporation), and BOX® (Box, Inc., a Delaware Corporation). The external cloud service 228, for example, may be a service available to users of the enterprise network 105. As such, even though the external cloud services 228 may be an external resource in the sense that the cloud service 228 may be outside of the enterprise network 105, and may even be directly accessible by endpoints 101, the gateway 108 may still support resource operation requests to such external resources from endpoints 101. As such, the external cloud services 228 may be treated similar to the internal resources 104 as described herein.

Other controllers 216 may also be included in the resource gateway 108. Similar to other resource types, other controllers 216 may be provided in order to interface with and perform resource operations on other internal resources 228. These other internal resources 228 may include any applications that support one or more native resource operations that may be submitted by another application (e.g., via an API or other interface).

Each internal resource 104 supports one or more "native" resource operations, such as the examples given above. As such, the Resource Access System 100 defines a set of resource operations that may be requested by endpoints 101. More specifically, in the example embodiment, the Resource Access System 100 defines a set of resource operations for various types of internal resources 104. Each controller 200 associated with the particular type of resource is configured to perform that set of resource operations on internal resources 104 of that type. These resource operations are defined as a set of API calls that may be submitted by the endpoints 101, or by the gatekeeper 110 on behalf of the endpoints 101. These API calls and their specific contents are described in greater detail below.

Each of the types of internal resources 104 may support differing avenues of communication between the particular type of internal resource 104 and the associated controller 200. For example, active directory 220 may support resource operations submitted via the X.500 protocol, and database servers 224 may support resource operations submitted through custom database connection libraries, and printers 122 may support resource operations submitted through device drivers. As such, it should be understood that each controller 200 and/or resource gateway 108 includes any particular code, drivers, libraries, networking protocols, or other software or hardware that enables the particular controllers 200 to perform resource operations and receive response information from the associated internal resources 104 as described herein.

During operation, a resource operation request (e.g., an API call) is submitted by the endpoint 101 to the resource gateway 108 (e.g., through the gatekeeper, as described above). The resource operation request is passed to a particular controller 200 based on the type of resource associated with the resource operation request. For example, if the resource operation request is a database resource operation, the resource operation request is passed to the database controller 208. If the resource operation request is a SharePoint resource operation, the resource operation request is passed to the SharePoint controller 206. The assigned controller 200 then interacts with one or more internal resources 104 to perform the resource operation on behalf of the user 113 and/or endpoint 101. Once the resource operation is complete, the results of the resource operation are transmitted back to the endpoint 101 (e.g., through the gatekeeper 110).

Figure 3:
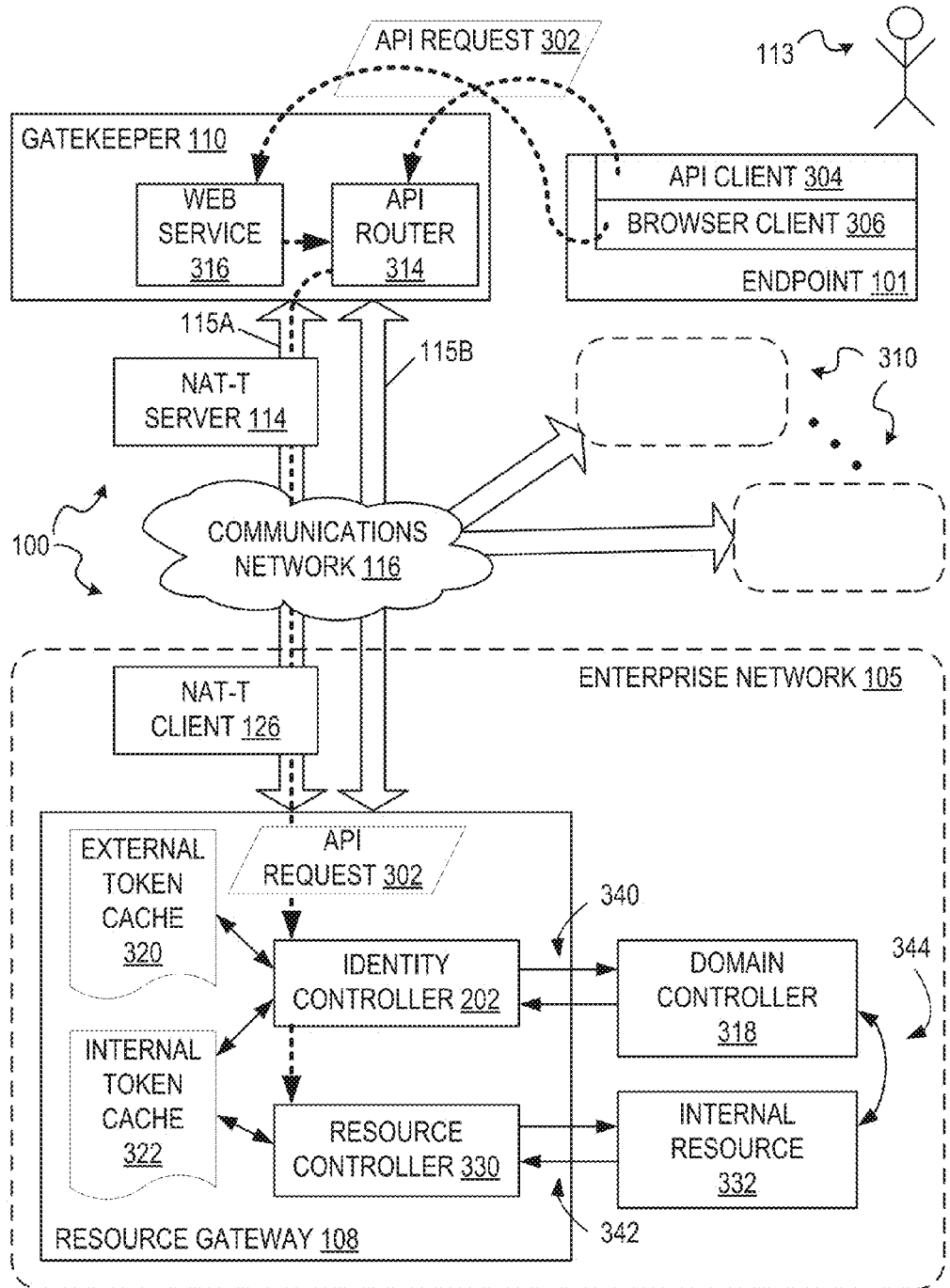
FIG. 3 is a network diagram of an endpoint submitting a resource operation request (e.g., an API request) to the Resource Access System shown in FIG. 1.

FIG. 3 is a network diagram of an endpoint 101 submitting a resource operation request (e.g., an API request 302) to the Resource Access System 100. In the example embodiment, the endpoint 101 includes an API client 304 that constructs the API request 302. The API client 304 is a RESTful API service that forms the API request 302 in an HTTP/HTTPS Representational State Transfer (REST) message format, and optionally with JSON or XML (e.g., in the body of an HTTP POST). In some embodiments, the Resource Access System 100 implements RESTful APIs as a SWAGGER® specification and web application framework (Smartbear Software Inc., a Delaware corporation) that can be called from any authorized service that is capable of calling REST based APIs. This allows third-party services to have a central and common method of accessing internal resources and integrating those services with their own service and other cloud services.

The API request 302 identifies an API operation (e.g., indicating what resource operation is to be performed) and a resource identifier (e.g., indicating on what internal resource 104 the resource operation is to be performed). Further, the API request 302 also identifies a domain (e.g., a domain name associated with the enterprise network 105) and a username of the requesting user (e.g., an identifier associated with the user 113), and/or a token for the user (e.g., a session token, or "external token" as described below). The API request 302 may also include other operational parameters that further clarify or tailor the resource operation based on the type of resource operation being performed. For example, the API request 302 may include these and other input variables or other operational parameters associated with the API request 302 in the form of a JSON string or XML block providing one or more individual REST resources (e.g., key-value pairs).

In the example embodiment, the API client constructs the API request 302 to include a "resource type" and a "resource operation" (as well as additional parameters). In other embodiments, the resource type may not be expressly included, but rather may be determined from other parameters in the API request 302, such as a resource identifier (e.g., of an internal resource 104, 332). For purposes of discussion, the nomenclature used herein to identify particular API operations is "API-<resource type>-<resource operation>", where <resource type> identifies the resource type (and associated controller 330), and where <resource operation> identifies the operation to be performed (e.g., on a resource of that <resource type>, such as the internal resource 332). For example, the operation "API-share-download" indicates a "download" operation on a "share" type resource (e.g., downloading a file from a particular share). It should be understood that this nomenclature is for purposes of discussion, and not necessarily indicative of the precise syntax of the API request 302.

As mentioned above, in the example embodiment, the API request 302 is formatted as HTTP REST messages, within which the <resource type> and <resource operation> information is embedded. For example, for a directory operation that retrieves AD users, the API request 302 may include "GET HTTPS://<HostName>:443/RAS system/Directory/GetUsers" as the HTTP verb and resource path, where the <HostName> is, for example, a DNS name or IP address of the gatekeeper 110, and where <resource type> is identified by the folder name "Directory" in the resource path, and the <resource operation> is identified by the file name "GetUsers" in the resource path (e.g., and where "RAS system" and any folder names preceding the <resource type> folder may be content insignificant to the processing of the API request 302 by the identity controller 202). As such, this example API request 302 may be referred to herein (e.g., under this nomenclature) as API-Directory-GetUsers. Similarly, because each <resource type> includes potentially multiple <resource operations> (i.e., each controller 200 associated with a particular resource type may make available multiple resource operations), the entire class of resource operations for a given <resource type> may be referred to herein "API-<resource type>". For example, API-share may be used to refer to an API operation that falls under the "share" resource type (e.g., the share controller 210), or to the class of share API operations.

Returning again to FIG. 3, the API client 304 establishes an HTTPS connection with the gatekeeper 110 and transmits the API request 302 across the secure channel for processing. Upon receipt of the API request 302, an API router 314 examines the contents of the API request 302 to determine the domain associated with the request. In the example embodiment, the gatekeeper 110 manages multiple domains, such as the enterprise network 105 and other networks 310, each of which includes a resource gateway similar to the resource gateway 108. The API router 314 maintains a mapping table that associates each domain name with a particular gateway. For example, presume the enterprise network 105 is associated with the domain name "my_co.com", and the user 113 (e.g., "John Smith") is an employee of "MyCo", and has a username of "jsmith" within a domain controller 318 in the enterprise network 105 (all purely fictitious for purposes of this disclosure). As such, the API router 314 identifies the domain name "my_co.com" from the API request 302, searches the mapping table for "my_co.com" domain, identifies an address (e.g., an IP address) associated with the resource gateway 108, and subsequently forwards the API request 302 to the resource gateway 108 for processing. As such, the gatekeeper 108 is able to route resource operation requests between various domains 105, 310.

The API Router 314 transmits the API request 302 to the gateway 108 through a communications path 115. As discussed with regard to FIG. 1, the gatekeeper 110 and/or gateway 108 may leverage the NAT path 115A or the direct path 115B for communications across the communications network 116. The API router 314 may determine which path 115A, 115B to use for the API request 302. Upon receiving the API request 302, and after determining which gateway the API request 302 is associated with (e.g., gateway 108), the API router checks a communications setting (e.g., a Boolean flag) associated with the gateway 108 to determine whether the gateway 108 may be directly accessed (e.g., via direct path 115B), or whether the gateway 108 uses the NAT-T Server 114 and Client 126 for communication (e.g., via NAT path 115A).

For example, in some enterprise environments, the gatekeeper 110 may be able to initiate TCP/IP communications directly with the gateway 108 and, as such, the API router 314 may establish an encrypted channel over the direct path 115B with the gateway 108 (e.g., HTTPS). In other enterprise environments, the gateway 108 may not be directly accessible from the gatekeeper 110 (e.g., not in an outer network layer, or a "DMZ", of the enterprise network 105). To facilitate communications into the gateway 108, the API router 314 may transmit the API request 302 to the NAT-T Server 114. The NAT-T Server 114 resides in the external network (e.g., in the cloud) and, in some embodiments, may operate as a separate server or service, or may operate as a service on the gatekeeper 110 itself, or may operate as a part of API router 314. The NAT-T Client 126 resides in the enterprise network 105, and is enabled to open connections out to the portal server (e.g., outbound TCP/IP connections through a perimeter firewall). The NAT-T Client 126 opens one or more persistent SSL connections ("request channels") to the NAT-T Server 114. During a resource access operation, such as after receiving the API request 302, the API router 314 transfers the API request 302 to the NAT-T Server 114 for transfer to the gateway 108. After receiving the API request 302 from the API router 314, the NAT-T Server 114 identifies one of the open, persistent request channels to the appropriate gateway 108 (e.g., to the NAT-T Client 126 associated with the gateway 108) and transmits the API request 302 (e.g., now in HTTP over SSL channel) over the NAT path 115A to the NAT-T Client 126. The NAT-T Client 126 then makes, for example, an HTTPS connection to the resource gateway 108 and transfers the API request 302 on to the gateway for processing. Response messages are transmitted back to the endpoint device or app in similar and reversed fashion (e.g., using the persistent SSL connections of the NAT path 115A back to the gatekeeper 110).

The NAT-T Server may listen on two separate TCP/IP ports for connection attempts from multiple sources such as, for example: 4343 for connection attempts from the NAT-T Client(s) 126; and 4344 for gatekeeper(s) 110 (e.g., API routers 314). As mentioned above, the NAT-T Client 126 connections over NAT path 115A may be requested and persistent SSL connections, which may be maintained, tracked, and used when needed communication with the associated gateway 108 is necessary. The NAT-T Client 126 may maintain more than one connection to the NAT-T Server 114, as each connection may only service a single request at a time. As such, when a new API request 302 passes to the NAT-T Client 126, the NAT-T Client 126 may establish an additional SSL connection with the NAT-T Server 114, for example, in order to always maintain at least one open and currently-unused connection over the NAT path 115A between the NAT-T Client 126 and the NAT-T Server 114. In some embodiments, unused connections may be removed and/or new connections may be created in order to maintain a pool of available or unused connections between the NAT-T Server 114 and the NAT-T Client 126 for that particular NAT-T Client 126.

The resource gateway 108 receives the API request 302 from the gatekeeper 110 and processes the API request 302. In the example embodiment, the identity controller 202 initially fields all incoming requests. The identity controller 202 establishes and maintains a token (e.g., a session token) for the user 113 that is used for external communications (e.g., between the gateway and the gatekeeper 110 and/or the endpoint 101). This token is referred to herein as the "external token" of the user 113, to distinguish from other tokens associated with the user 113 and communications between components. The identity controller 202 stores the external token of the user 113 in an external token cache 320. This external token is a session token that is shared with the endpoint 101 and is provided by the endpoint 101 in subsequent API requests to, among other things, establish authentication credentials for the endpoint 101 (e.g., to certify that the user 113 has already logged in). It should be noted that this external token is created as between the gateway 108 and the endpoint 101, and is distinct from any other tokens that may be established for encrypting point to point communications between, for example, the gateway 108 and the NAT-T client 126, the NAT-T Client 126 and the NAT-T Server 115, the NAT-T Server 115 and the gatekeeper 110, the gateway 108 and the gatekeeper 110, or the endpoint 101 and the gatekeeper 110 (e.g., tokens that may be created as a part of HTTPS or SSL communications).

The identity controller 202 initially examines the contents of the API request 302 to determine which resource controller 330 (e.g., from the pool of resource controllers 200) will perform or process the API request 302. More specifically, in the example embodiment, the API request 302 includes a <resource type> and <resource operation> as described above (e.g., as part of an HTTP REST message format). The identity controller 202 uses the <resource type> to identify the particular controller 330 that will process the API request 302 (e.g., from the pool of controllers 200). The identity controller 202 may identify the resource controller 330 using a mapping table such as the example mapping table shown in Table 1:

TABLE 1

Example Resource Type to Controller Mapping Table

| <resource type> | Target Resource Controller 330 |
| --- | --- |
| Login | Identity Controller 202 |
| SQL | Database Controller 208 |
| Share | Share Controller 210 |
| Print | Printer Controller 212 |
| Directory | Directory Controller 204 |
| SP | SharePoint Controller 206 |
| 3rdPartyApp | Other Controller 216 |
| 3rdPartyCloudApp | Cloud App Controller 214 |

It should be understood that the Example Resource Type to Controller Mapping Table shown in Table 1 is merely an example, and that many variations are possible. The mapping table used by the identity controller may include any number of resource types and associated resource controllers. For example, as mentioned in respect to FIG. 2, there may be many database controllers 208 (e.g., for multiple types of databases, or vendors, or versions, and so forth), share controllers 210, printer controllers 212, directory controllers 204, SharePoint controllers 206, and other controllers 216 for internal or $3^{rd}$ party applications, or cloud app controllers 214. As such, there may be different <resource types> for each, and each of those <resource types> may map to the same or different controllers.

For some resource types, the identity controller 202 may field the request itself (e.g., without passing the API request 302 on to another resource controller 330). As shown in Table 1, for example, the identity controller 202 handles all API-Login requests (e.g., authentication operations 340 with the Domain Controller 318). The identity controller 202 performs authentication of the user 113 to establish a token for the user 113 with the directory service 118 (e.g., the domain controller 318). This token is referred to herein as an "internal token," or an "authentication identifier," to distinguish from other tokens associated with the user 113, such as the external token described above. In an API-Login API request 302, the user 113 provides their authentication credentials (e.g., domain/username and password for the domain controller 318) in the API request 302. The identity controller 202 performs authentication 340 with the domain controller 318, and as the user 113 (e.g., with the user's credentials). If authentication is successful, the domain controller 318 provides the internal token for the user 113 to the identity controller 202. The identity controller 202 stores the internal token for the user in an internal token cache 322. Further, the identity controller 202 associates the internal token of the user 113 with the external token of the user 113 (e.g., in different columns of a shared table, or by commonly identifying each based on a separate identifier for the user 113, such as the domain/username of the user 113). In some embodiments, the internal token is stored and used by the gateway 108, and is not sent back to the gatekeeper 110 or the endpoint 101, as it is the gateway 108 that will use the internal token to execute resource operations on behalf of (e.g., as) the user 113. API-Login operations are described in greater detail below with respect to FIGS. 4A and 4B.

For API requests 302 that are not assigned to the identity controller 202 (e.g., based on Table 1), the identity controller 202 passes the API request 302 on to the assigned resource controller 330 for processing. In the example embodiment, the API request 302 not only includes the <resource operation>, as described above, but also includes a resource identifier identifying which internal resource 332 (e.g., from the pool of internal resources 104) is to be the target of the <resource operation>. In some embodiments, a key-value pair within the JSON or XML content of the API request 302 may identify the <resource operation>, or a particular internal resource 332 (e.g., the server name of a particular database, or the IP address of a particular printer), and the gateway 108 may identify the resource controller 330 and/or the internal resource 332 using this data. Accordingly, the resource controller 330 identifies the <resource operation> to be performed, as well as the internal resource 332 on which to perform the <resource operation>.

As described above, the resource gateway 108 (e.g., the resource controller 330) performs the <resource operation> on the internal resource 332 as the user 113 (e.g., with the user's credentials). More specifically, when the resource controller 330 receives the API request 302 for processing, the resource controller 330 retrieves the user's internal token from the internal token cache 322. The resource controller 330 then performs the <resource operation> with the internal resource 332 as the user 113, providing the user's internal token to the internal resource 332. The internal resource 332 performs authorization 344 for the <resource operation> with the domain controller 318 based on the provided token (e.g., identifying the SID of the user 113, and confirming whether the user 113 is permissioned to execute the <resource operation> on that particular internal resource 332). The processing of resource operations is described below in greater detail with respect to FIG. 5.

After the resource operation is completed with the internal resource 332, the gateway 108 (e.g., the particular resource controller 330) generates a response message (not separately shown in FIG. 3) with the results of the <resource operation> (e.g., provided by the internal resource 332). The Resource Access System 100 defines a schema for each type of resource operation, both for the API request 302, as well as the response message. Each response schema includes one or more key-value pairs, the value(s) of which may be populated based on the output and/or results of performing the resource operation on the internal resource 332. These key-value pairs are assembled as a JSON string or XML block and passed back through the particular communications channels through which the API request 302 was sent (not separately illustrated in FIG. 3). As such, the endpoint 101 receives the response message and may, for example, parse the JSON string for the particular fields of interest to the endpoint 101 (e.g., results status variables, output of the resource operation, or other values).

In some embodiments, the endpoint 101 may alternatively include a browser client 306 that constructs and transmits API requests 302 to a web service 316 (e.g., operated by, or otherwise in conjunction with, the gatekeeper 110). The API requests 302 constructed by the browser client 306 are in the form of HTTP requests submitted to the web service 316 from, for example, a browser on the endpoint 101. The web service 316 receives the API request 302 from the browser client 306, constructs (or reconstructs) the API request 302 into an HTTP REST type request, as described above (e.g., as would be constructed by an API client 304), and submits the API request 302 to the API router 314 for continued processing as described above. In other words, the web service 316 acts as an "API client proxy" for generating API requests in a standard form (e.g., like an API client 304 would) for endpoints 101 that do not have the API client 304, or for whatever reason submit API requests 302 through the browser client 306.

In some embodiments, the Resource Access System 100 also includes a dedicated user authentication and authorization system specific to the Resource Access System 100 (referred to herein as the "RAS User System", not separately identified in FIG. 3). This RAS User System provides authentication and/or authorization services for the incoming API requests 302 and, as such, are referred to herein as external authentication or external authorization (e.g., because an API request 302 from an external endpoint is being authenticated or authorized). Further, the RAS User System may be referred to herein as a secondary user system (e.g., a user system in addition to the directory service 118). The identity controller 202 performs such external authentication and authorization operations based on, for example, the user, resource operation, resource type, and/or internal resource 104 identified in the incoming API request 302. For example, the RAS User System may authenticate the endpoint 101 and/or the gatekeeper 110 based on the API request 302 (e.g., based on the username provided in the API request 302, or based on an external token provided in the API request 302). Additional details of the external authentication and authorization process is described below with respect to FIGS. 4A, 4B, and 5.

FIG. 4A is a swimlane flowchart of a login process 400 for pass-through authentication of the requesting user (e.g., user 113 of endpoint 112) within the Resource Access System 100. In the example embodiment, the process 400 is performed by components of the Resource Access System 100, such as the gatekeeper 110 (e.g., the API router 314), the resource gateway 108 (e.g., the identity controller 202), and the directory service 118 (e.g., the AD domain controller 318), as well as the endpoint 101. As described above, the login process 400 may be performed as an initial operation in preparing the Resource Access System 100 to facilitate providing external access to computing resources within a protected network.

At operation 402, the endpoint 101 initiates an API-Login request. This request may be similar to the API request 302 shown and described above with respect to FIG. 3, and as described above, may be generated by the API client 304 on the endpoint 101, or the browser client 306. The API-Login request includes user credentials of the user 113, such as a domain name, a user name or ID within that domain, and a password. The endpoint 101 transmits the API-Login request to the gatekeeper 110 (e.g., via an encrypted communications channel, such as HTTPS, using a DNS name or IP address for the gatekeeper 110). For example, presume our user 113 is still John Smith (username "jsmith"), an employee of MyCo (which uses the domain name "my_co.com"). As such, the API-Login request may include (domain_name, user_name, password) of ("my_co.com", "jsmith", "AbCdEf12"). The API-Login may also include a URL for the domain_name that may serve, for example, to distinguish between multiple sub-domains within an overall enterprise. In some embodiments, the domain name and/or URL may be included as unencrypted text (e.g., as the resource path of the REST message), and the JSON string may include {UserName: jsmith, Password: AbCdEf12}.

At operation 410, the gatekeeper 110 receives the API-Login request and identifies a target gateway for the request. More specifically, the gatekeeper 110 inspects the contents of the API-Login request to extract the domain name included within the request. As mentioned above, the gatekeeper 110 may process requests for several networks 105, 310. The gatekeeper 110 uses the domain name included in the API-Login request to identify which network 105, 310, and thus which gateway, to identify as the target of the API-Login request. The gatekeeper maintains a database mapping between domain names and their associated networks 105, 310, and thus their associated gateways. For example, a domain mapping table may include an entry for (domain_name, gateway_IP) of ("my_co.com", "11.22.33.44"). The gatekeeper 110 extracts the domain name "my_co.com" from the API-Login request, searches the domain mapping table to identify the example entry above, and identifies the IP address of "11.22.33.44" to use for the target gateway for this request (e.g., the resource gateway 108). It should be understood that the IP address associated with the target gateway may not necessarily be an IP address directly hosted by the gateway. For example, the IP address may be hosted by a perimeter device, such as an enterprise firewall that performs network address translation for traffic from the gatekeeper 110 to the gateway 108.

In some embodiments, the gatekeeper 110 may use the URL to identify the associated gateway 108. In other embodiments, the gatekeeper 110 may take a client name or client identifier as a part of the API-Login request, and may determine the associated gateway 108 from the client name or client identifier. In still other embodiments, the API-Login request may specify the IP address of the gateway, and the gatekeeper 110 may simply use that IP address directly as given in the API-Login request.

At operation 412, the gatekeeper 110 routes the API-Login request to the resource gateway 108 (e.g., as described above with respect to the API router 314). At operation 420, the resource gateway 108 receives the API-Login request from the gatekeeper 110 and extracts the user credentials (e.g., the domain name, the user name, the password) from the API-Login request. At operation 422, the resource gateway 108 initiates an authentication operation with the directory service 118 (e.g., the AD domain controller 318). More specifically, the authentication operation with the directory service 118 is performed using the user credentials provided in the API-Login request. In other words, the resource gateway 108 performs an authentication with the directory service 118 as if it were the user 113. In the example embodiment, the directory service 118 is the AD domain controller 318.

At operation 430, the directory service 118 authenticates the user credentials sent from the gateway 108. For example, in embodiments where the directory service 118 is AD (e.g., using Kerberos authentication), the resource gateway 108 may send an authentication request (e.g., a Kerberos authentication service request, or "AS_REQ", to the Key Distribution Center (KDC)) with the user credentials to an authentication service (AS) of the domain, and the AS may generate and transmit a ticket-granting ticket (TGT) back to the gateway 108 after verifying the user credentials (e.g., as an AS_REP response). Under AD, the TGT is the "internal token" or authentication identifier for the user, and may be locally cached on the gateway 108 (e.g., in RAM memory, or in the internal token cache 322).

At test 432, if the directory service 118 determines that the user credentials are not valid, then the directory service 118 rejects the authentication request to the gateway 108. In turn, at operation 434, the gateway 108 transmits an API-Login failure response to the gatekeeper 110 (e.g., in response to the initial API-Login REST request). At operation 436, the gatekeeper 110 routes the API-Login failure response to the endpoint 101, received by the endpoint 101 at operation 438.

If, at test 432, the directory service 118 determines that the user credentials are valid, then the directory service 118 responds with the internal token at operation 440. At operation 442, the gateway 108 receives the internal token associated with the API-Login request and stores the internal token for later use. For example, the resource gateway 108 may store the internal token within the internal token cache 322 for use in future API requests 302 of the user 113.

Referring now to FIG. 4B, the resource gateway 108, in some embodiments, includes the RAS User System described above. FIG. 4B is a swimlane flowchart illustrating additional process operations 444-454 that may be performed by the gateway 108 in such embodiments. At operation 444, the gateway 108 validates the user 113 within the RAS User System. In other words, not only is the user 113 validated within the directory service 118 (e.g., at operation 430), but the user 113 must also be authenticate and/or authorize within the RAS User System. More specifically, the RAS User System includes a database of users of the Resource Access System 100. Each user identified within the RAS User System includes a user identifier that uniquely identifies each user within the RAS User System. In the example embodiment, the user identifiers within the RAS User System mirror the user identifiers of the directory service 118 (e.g., the domain name and/or SID defined within the AD domain controller 318). In some embodiments, the user identifiers may not mirror the user identifiers of the directory service 118, but the RAS User System may maintain a mapping between the RAS User System user identifiers and the associated directory service user identifiers.

The gateway 108 searches the RAS User System for the user identifier associated with the API-Login request. At test 446, if the user is not found in the RAS User System, or is expressly denied (e.g., RAS role=None, described below, or disabled via a Boolean flag) or is otherwise not configured in the RAS User System to allow a general login to the Resource Access System 100, then the user is not authorized to use the Resource Access System 100, and the gateway 108 transmits an API-Login failure to the gatekeeper 110 at operation 448. At operation 450, the gatekeeper 110 routes the API-Login failure to the endpoint, who receives the failure at 452. In some embodiments, operations 448, 450, and 452 are similar to operations 434, 436, and 438 shown in FIG. 4A.

If, at test 446, the gateway 108 determines that the user is authorized to access the Resource Access System, then the gateway 108 determines a role for the user (e.g., based on user_name). Each user in the RAS User System may be assigned to one of the pre-defined roles including: "Admin", "User", "Read Only User" and "None". A user with role="None" is not allowed to log in to the Remote Access System 100, and is thus subject to a failure of the API-Login request, as described above. A user with the role="Read Only User" is allowed to log into the Remote Access System 100, and can view information, but is not allowed to perform any write operations (e.g., even if they have permission to perform the operation natively with the resource, such as through the directory service 118). A user with the role="User" is allowed to perform all user-level operations based on the user's native permissions (e.g., the RAS User System will not restrict an operation that would otherwise be allowed by the directory service 118). A user with the role="Admin" has the permissions equivalent to the role of "User" plus the ability to administer the RAS User System (e.g., including changing user roles, such as adding or removing Admins).

In some embodiments, the roles are assigned as AD groups (e.g., within the AD domain controller 318). For example, group names for each role may be created within AD as "RAS-Admins", "RAS-Users", and "RAS-ReadOnly". Some directory services such as AD may use a "most restrictive" approach to resolving permission contention between conflicting rules for the same user. For example, presume the user 113 is a member of a group "Marketing", which is given read/write privileges to a file, "Marketing Spreadsheet.xls". Presume also that the user 113 is also a member of a group "Management", which is given read-only privileges to the same file "Marketing Spreadsheet.xls". When the user 113 attempts to access the file for write, the directory service 118 determines that the user 113 is given write permission to the file by being a member of the group "Marketing", but is given read-only privileges to that file by the group "Management". In such a "most restrictive" rule resolution scheme, the directory service 118 may deny write access to the user 113 in this scenario.

The RAS User System leverages this "most restrictive" feature of rule resolution of the directory service 118 (e.g., the native AD group policy). More specifically, and for example, the user 113 has privileges defined by the directory service 118 (e.g., the AD domain controller 318) by a set of groups A, B, and C. In other words, groups A, B, and C define what the user 113 can access (e.g., while on the enterprise network 105, internally), or the resultant set of policies that apply for the user 113. The RAS User System assigns an extra (e.g., additional) group to the user when the user 113 accesses the Resource Access System 100 externally (e.g., from the Internet), which may limit or alter the user's permissions as compared to what they had natively when accessing the enterprise network 105 internally. In other words, the RAS roles may leverage the directory service groups to limit or otherwise preempt what the user 113 may otherwise have had access to. The "RAS-ReadOnly" group, for example, may include read-only permissions to resources (e.g., altering access control lists (ACLs) for files) that, when combined with groups A, B, and C, serve to preempt write privileges that the user 113 may otherwise have had (e.g., as described in the example above). These roles and associated groups may be configured to create specific policies specific to users coming in through the Resource Access System 100. The "RAS-Users" role may be defined as a group with little or no additional restrictive permissions, allowing external users to access internal resources 104 as they normally would (e.g., were they within the enterprise network 105 internally).

This ability of the RAS User System to leverage the rule conflict resolution attributes of the director service enables the Remote Access System 100 to preempt or override users' internal permissions when accessing resources from the external network (e.g., restrict access to certain files or certain file servers) by adding in one or more additional groups to the user 113 when the user is accessing resources externally. This method of implementation leverages the native features of the directory service 118. As such, administrators may make changes to the RAS User System using normal AD management tools, and without affecting or altering the users' normal (e.g., internal) permissions. In other words, and continuing the example, the RAS User System does not need to modify groups A, B, and C, but simply layers additional groups onto the user's permissions based on the role defined for the user.

As such, the roles defined herein provide an additional control that may potentially further restrict what the user may or may not do from outside the enterprise network 105 (e.g., restricting some operations that might otherwise be allowed by the internal resources 104 natively). The gateway 108 may control aspects of external access to users that may be significant for various reasons such as, for example, security or privacy concerns for certain data or certain types of resources (e.g., restricting sensitive data from being accessed from outside the network, even if that user would normally have access to the data while within the enterprise network 105), user access controls for terminated employees (e.g., limiting remote access to terminated employees, while they may still retain internal access until their exit date), or restricting external access to certain operations that might otherwise be available to the user (e.g., prohibiting deletion of files from outside the enterprise network 105).

At operation 456, the gateway 108 generates an external token for the endpoint. This external token is used during later operations, among other things, to identify the endpoint and certify that the endpoint has already authenticated with the Remote Access System 100 (e.g., that there should already be an internal token stored for this endpoint/user). The external token may be stored in the external token cache 320. Further, at operation 458, the gateway 108 associates the external token with the internal token of the user (e.g., together in a database). This association may also include the user identifier as well (e.g., the domain_name and user_name from the API-Login request). As such, the gateway 108 may be able to access any of the other two data elements given the third.

Returning now to FIG. 4A, the gateway 108 transmits a success response to the API-Login request to the gatekeeper 110 at operation 460. The success response includes the external token, as well as a status indicator for the API-Login request. At operation 462, the gatekeeper 110 receives the response to the API-Login request and routes the response to the appropriate endpoint 101. At operation 464, the endpoint 101 receives the successful response to the API-Login request. Once the endpoint 101 has successfully logged into the Remote Access System 100, the endpoint 101 may commence resource operations through submitting additional API requests 302, as described below with regard to FIG. 5.

Figure 5A:
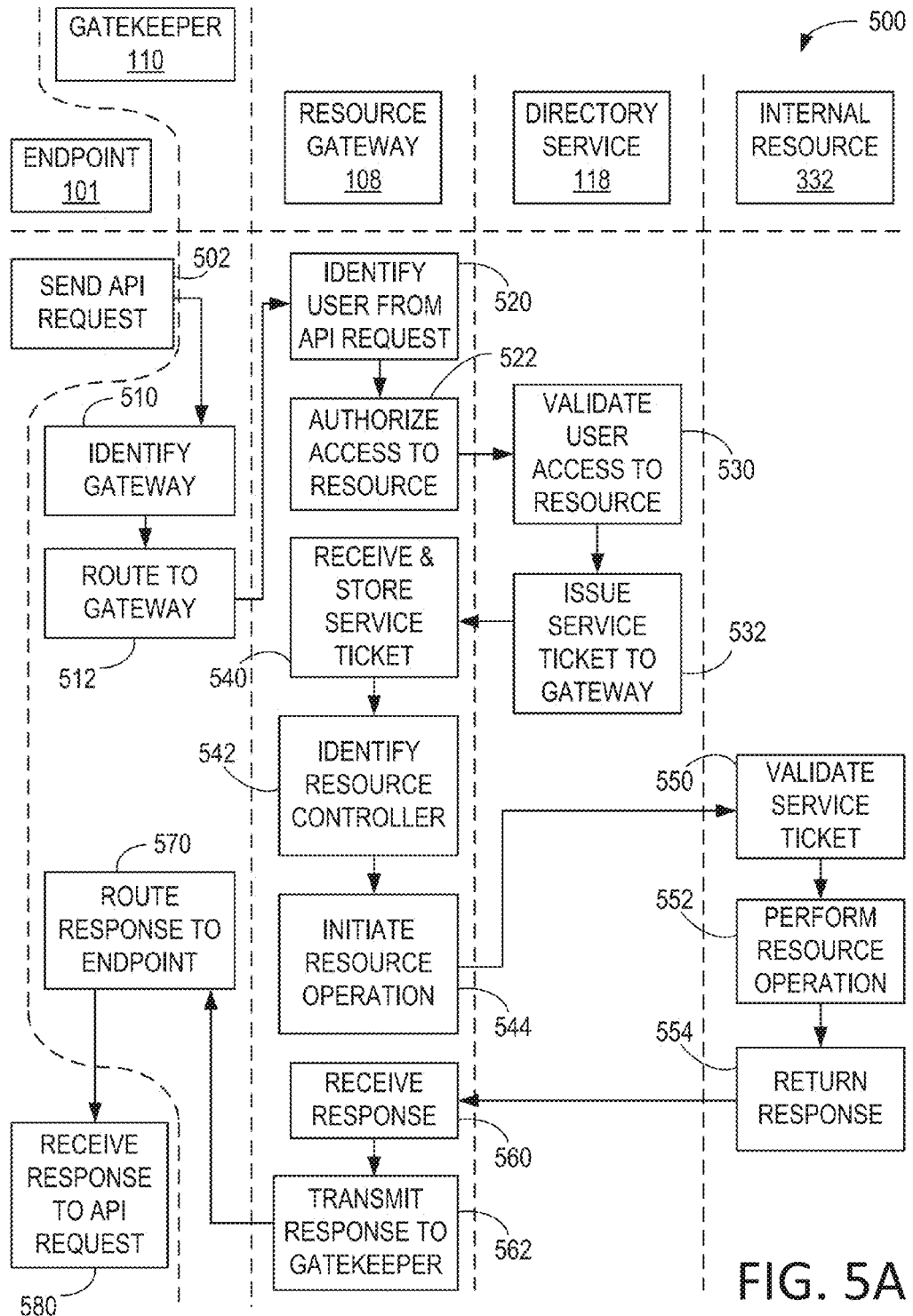
FIG. 5A is a flowchart of an example process to perform pass-through impersonation for an API request, submitted to the Resource Access System by an endpoint, for a resource operation on the internal resource.

FIG. 5A is a flowchart of an example process 500 to perform pass-through impersonation for an API request, submitted to the Resource Access System 100 by an endpoint 101, for a resource operation on the internal resource 332. In the example embodiment, the process 500 is performed by components of the Resource Access System 100, such as the gatekeeper 110 (e.g., the API router 314), the resource gateway 108 (e.g., the identity controller 202), and the directory service 118 (e.g., the AD domain controller 318), the endpoint 101, and the internal resource 332. Further, the operations shown in FIG. 5 presume that the login process for the user 113 (e.g., as described above in respect to FIGS. 4A and 4B) has already been performed. In other words, the endpoint 101 has successfully established an external token with the resource gateway 108 that is still valid (e.g., unexpired) at the time of this API request, and the resource gateway 108 has authenticated as the user 113 with the directory service 118 (e.g., the domain controller 318) and has a valid, unexpired internal token for the user 113 cached and/or stored in the internal token cache 332.

At operation 502, the endpoint 101 initiates an API request. This request may be similar to the API request 302 shown and described above with respect to FIG. 3, and as described above, may be generated by the API client 304 on the endpoint 101, or the browser client 306. The API request includes the external token of the user 113 (e.g., generated and received by the endpoint 101 as described above), the domain name and the user SID, and operational parameters as described above with respect to the API request 302 (e.g., a resource operation, an internal resource, or other operational parameters associated with particular resource operations). The external token is tied to a session ID associated with the user 113, so they may not be hijacked and maliciously used, and may also include an expiration timer.

Table 2, below, shows a list of example API requests that may be performed by the Resource Access System 100 for a few example resource types:

TABLE 2

Example Resource Operations

| HTTP REST Verb | <resource type> | <resource operation> |
| --- | --- | --- |
| POST | Directory | GetUsers |
| POST | Directory | GetADObjects |
| GET | Directory | GetUserBySid |
| POST | Directory | GetMembersOfRole |
| POST | Directory | SetRoleForUser |
| POST | Directory | GetUserProfileFolders |
| POST | Directory | GetGroups |
| POST | Directory | GetComputers |
| POST | Directory | GetFilesAndFolders |
| GET | Login | GetUserSidAndRole |
| GET | Login | GetThirdPartyToken |
| GET | Login | GetOAuthSetting |
| POST | Print | Upload |
| POST | Print | ViewUpload |
| POST | Print | SharedFile |
| POST | Print | ViewSharedFile |
| POST | Share | GetFilesAndFolders |
| POST | Share | UploadFile |
| POST | Share | CopyFiles |
| POST | Share | CheckoutFile |
| POST | Share | CheckinFile |
| POST | Share | DeleteFiles |
| POST | Share | RenameFile |
| POST | Share | GetFileHistory |
| GET | Share | Download |
| POST | Share | CreateFolder |
| POST | Share | GetFileView |
| GET | Share | GetViewableFileExtensions |
| POST | SQL | GetDBs |
| POST | SQL | GetTables |
| POST | SQL | GetViews |
| POST | SQL | GetStoredProcedures |
| POST | SQL | QueryTable |
| POST | SQL | GetMoreQueryResults |
| POST | SQL | ExecuteStoredProcedure |

It should be understood that the resource operations shown in Table 2 are merely exemplary. For example, the Resource Access System 100 may also define resource operations for other file management applications, both internal and external, such as for network filesystems, SharePoint, Box, DropBox, Office 365, and such. As described above, many types of resources are possible and are within the scope of this disclosure.

The Resource Access System 100 defines an "input schema" for generating API calls for each particular resource operation, as well as an "output schema" for the output provided by that particular resource operation. For example, the resource operation API-SQL-GetTables may have an input schema (listed here in JSON format) of:

{"ServerName": <string>} where the ServerName <string> is the name of a database server provided as a part of the API request. The output schema for this resource operation (again listed in JSON format) may be:

```
[
  {
    "Name": <string>,
    "Owner": <string>,
    "Rows": <integer>,
    "LastModifiedDate": <date_time>,
    "ServerName": <string>
  }
]
```

The fields of the input schema and output schema are defined by the Resource Access System, and the endpoint 101 may form API requests 302 (e.g., as a part of operation 502) for particular resource operations according to the pre-defined input schema for that resource operation, as well as expect the particular fields to be populated in successful responses.

Returning to FIG. 5A, the endpoint 101 transmits the API-Login request to the gatekeeper 110 (e.g., via an encrypted communications channel, such as HTTPS, using a DNS name or IP address for the gatekeeper 110). At operation 510, the gatekeeper 110 receives the API request, identifies the targeted gateway for the request, and routes the API request to the gateway 108 at operation 512. Operations 510 and 512 may be similar to operations 410 and 412.

Figure 5B:
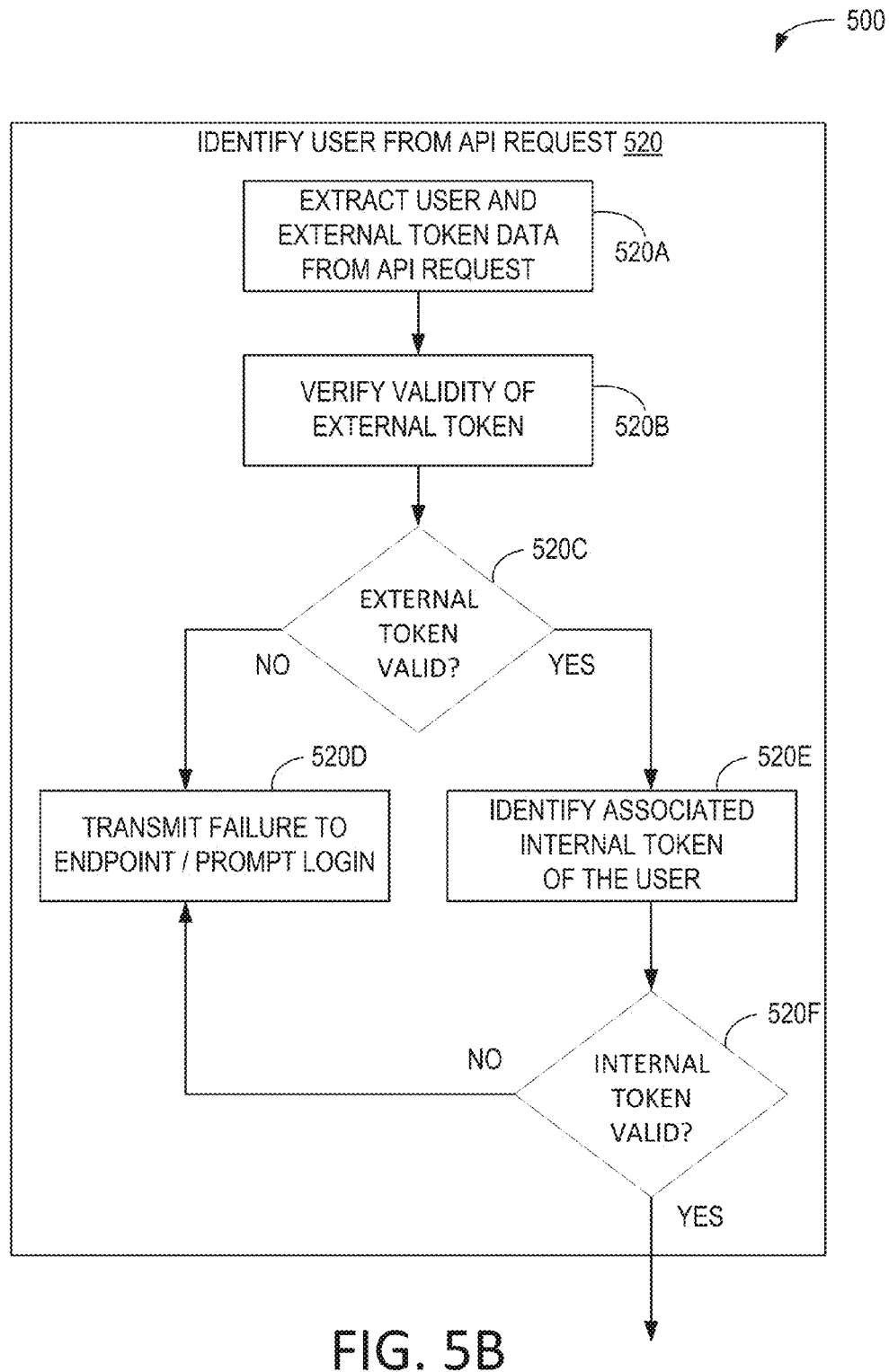
FIG. 5B is a flowchart illustrating additional operations for performing the resource operation shown in FIG. 5A.

At operation 520, the resource gateway 108 receives the API request from the gatekeeper 110 and extracts the user credentials (e.g., the domain name, the user name, the external token) from the API request. FIG. 5B is a flowchart illustrating additional operations for performing operation 520. As a part of operation 520, the gateway 108 extracts the user and/or external token data from the API request at operation 520A. The gateway 108 accesses the external token cache 320 to verify the validity of the external token provided with the API request. Each external token may include a timeout value or an expiration time for which the external token remains valid. If 520C the external token is not valid (e.g., does not exist in the external token cache 320, or has expired), the API request may be rejected by the gateway 108 at operation 520D, and the user 113 may be prompted to re-establish a new external token (e.g., perform the API-Login process again). If 520C the external token is valid, the gateway 108 uses the external token provided with the API request to identify the associated internal token for the user 113 (e.g., from the internal token cache 322). If 520F the internal token for the user is not valid (e.g., does not exist in the internal token cache 322, or has expired), the API request may similarly be rejected by the gateway 108 at operation 520D. If 520F the internal token is valid, then the gateway 108 proceeds with operation 522.

Figure 5C:
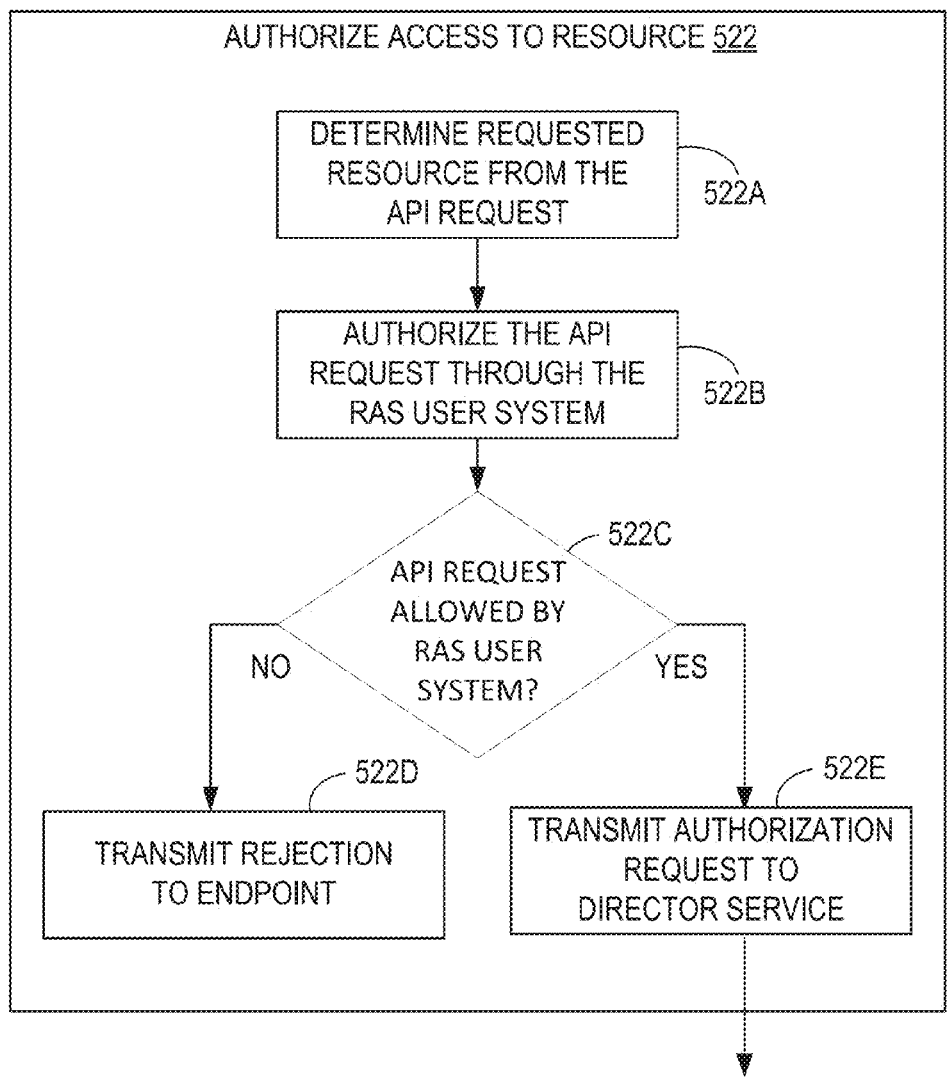
FIG. 5C is a flowchart illustrating additional operations for performing the resource operation shown in FIG. 5A.

Referring now to FIG. 5A, at operation 522, the resource gateway 108 performs an authorization operation with the directory service 118 for the resource operation. FIG. 5C is a flowchart illustrating additional operations for performing operation 522. As a part of operation 522, the gateway 108 determines the resource identified by the API request at operation 522A. For some resource operations, the input schema may include an input variable that identifies the resource, such as a resource name, an IP address, DNS name, a TCP port number, a share, a file name, a path, and/or a directory identifier for the resource (e.g., a service principal name (SPN)). In some embodiments, the endpoint 101 may first execute a resource query operation such as, for example, API-Share-GetFilesAndFolders, which may enumerate and return a list of resources (e.g., files and folders) to which the user 113 has access. As such, from this list of resource, the endpoint 101 may identify the specific resource to access (e.g., a server name/IP address, directory path and filename of a file), and may use this as the resource name to include as a part of this resource operation.

In some embodiments, at operation 522B, the gateway 108 may authorize the API request based on the RAS User System. For example, the gateway 108 may check the role of the user 113 against the resource operation, or the requested resource. If the role is defined as "Read Only User", the RAS User System may restrict certain <resource operations>, such as API-Share-DeleteFiles or API-Share-CheckoutFile. If 522C the user 113 is not permissioned to perform the particular resource operation identified by the API request, or is not permissioned to access the resource identified by the API request, for example based on the role of the user 113, then the gateway 108 may reject the API request at operation 522D and transmit a rejection message to the endpoint 101. If 522C the user 113 is permissioned to perform the given API request, then the gateway 108 creates and transmits an authorization request to the directory service 118 at operation 522E. In the example case of AD, the authorization request is a Ticket Granting Service Request (TGS_REQ) message to the KDC of the directory service 118. The TGS_REQ identifies the resource by service principal name (SPN), as well as the internal token of the user 113 (e.g., the TGT). Once transmitted, then the process 500 shifts to the directory service 118 with operation 530.

Referring again to FIG. 5A, at operation 530, the directory service validates user access to the requested resource (e.g., as described above, through RAS role, AD group policies, and/or file ACLs). If the user is permissioned by the directory service 118 to access the given resource, then the directory service 118 issues a service ticket back to the gateway 108 for the API request at operation 532. In the case of AD, the KDC responds with a TGS_REP message with the service ticket.

At operation 540, the gateway 108 receives and caches the service ticket from the directory service 118. At operation 542, the gateway 108 identifies a resource controller 330 for processing the given API request (e.g., one of the controllers 200). As described above with respect to FIG. 3, an appropriate controller 330 may be identified in one of several ways such as, for example, based on the <resource type> provided with the API request, or by the particular resource 332 identified by the API request. At operation 544, the API request is processed by the identified resource controller 330. Also as described above, it should be understood that the various types of resource controllers 200 and/or resources 104, 228 may each operate quite differently when performing different resource operations. For example, "SQL" resource type operations performed by a database controller 208 may interact with database servers 224 to perform the various <resource operations> than "Share" resource type operations performed by share controllers 210 interacting with file shares 222. In many cases, operation 544 includes transmitting the service ticket and/or the internal token to the resource 332.

At operation 550, the resource 332 validates the service ticket. In some embodiments, the validation of the service ticket may satisfy authentication of the user for the resource 332, but may not completely satisfy authorization to access the particular resource 332 and/or perform the requested operation. The resource 332 may also examine the internal token for additional authorization of the user, the particular resource (e.g., a particular file on a share), and/or the requested operation. For example, the resource 332 may examine group membership information provided with the Privilege Attribute Certificate (PAC) from the service ticket. If authorized, the resource 332 performs the requested operation at operation 552 and returns a response to the gateway 108 at operation 554.

At operation 560, the gateway 108 (e.g., the resource controller 330) receives the return response (e.g., output contents, requested file, status information) from the resource 332. The gateway 108 then forms a response message that includes some or all of the data received from the resource 332. More specifically, the gateway 108 identifies the output schema for the particular API request and builds the response message with the data from the resource 332 based on that output schema (e.g., as a JSON string). At operation 562, the gateway 108 transmits the response message to the gatekeeper 110, who then passes the message back to the endpoint 101. As described above, the endpoint 101 is then able to unpack the response message and extract the requested data, thus accomplishing external access to an internal resource 332 through the Resource Access System 100.

Figure 6:
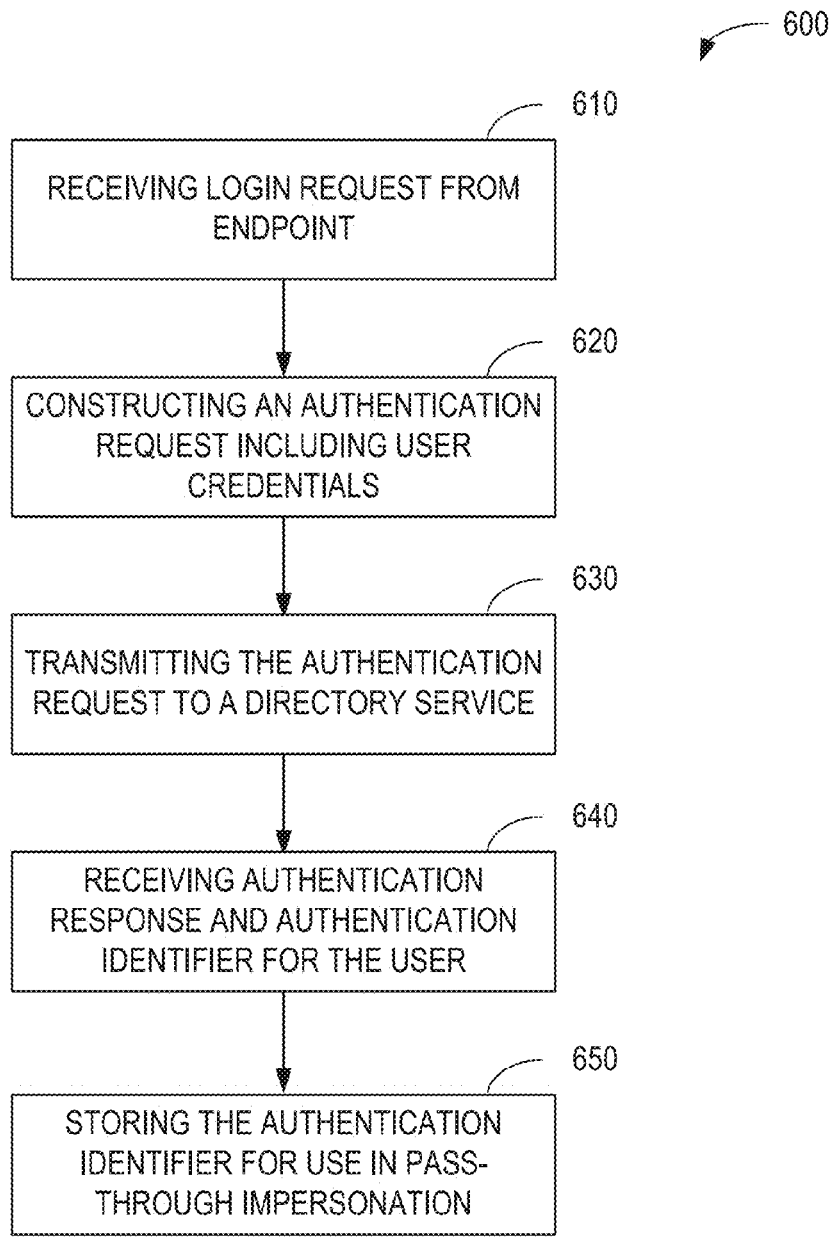
FIG. 6 is a flowchart illustrating an example method for pass-through authentication of a user such as the user shown in FIG. 1.

FIG. 6 is a flowchart illustrating an example method 600 for pass-through authentication of a user such as the user 113 shown in FIG. 1. In the example embodiment, the method 600 is performed by a computing device including a processor and memory which may be similar to the gateway 108, or a machine 1000, or by a software architecture. In some embodiments, the method is performed by a gateway device residing in an internal network such as enterprise network 105, wherein the endpoint resides in an external network, such as the communications network 116, separated from the internal network such that the endpoint is restricted from performing the authentication request directly with a directory service.

In operation 610, the method 600 includes receiving a login operation request from an external endpoint, the login operation request including a user identifier and user login credentials of a user. In some embodiments, the login operation request is an application program interface (API) message formatted as a hypertext transfer protocol (HTTP) representational state transfer (REST) message. At operation 620, the method 600 includes constructing an authentication request including the user identifier and the user login credentials.

At operation 630, the method 600 includes transmitting the authentication request to an internal directory service, such as the domain controller 318. At operation 640, the method 600 includes receiving an authentication response from the internal directory service, the authentication response including an authentication identifier for the user. In some embodiments, the authentication identifier is a Ticket to Grant Tickets (TGT). At operation 650, the method 600 includes storing the authentication identifier in the memory, the authentication identifier for use by the processor in pass-through impersonation of the user.

In some embodiments, the method 600 further includes generating an external token associated with the endpoint, associating the authentication identifier with the external token, and transmitting the external token to the endpoint. In some embodiments, the method 600 further includes authorizing the user based on a secondary user system and determining a role for the user based on the user identifier. In some embodiments, the method 600 further includes receiving a resource operation request from the endpoint, determining the authentication identifier associated with the resource operation request, and initiating a resource operation with an internal resource as the user.

Figure 7:
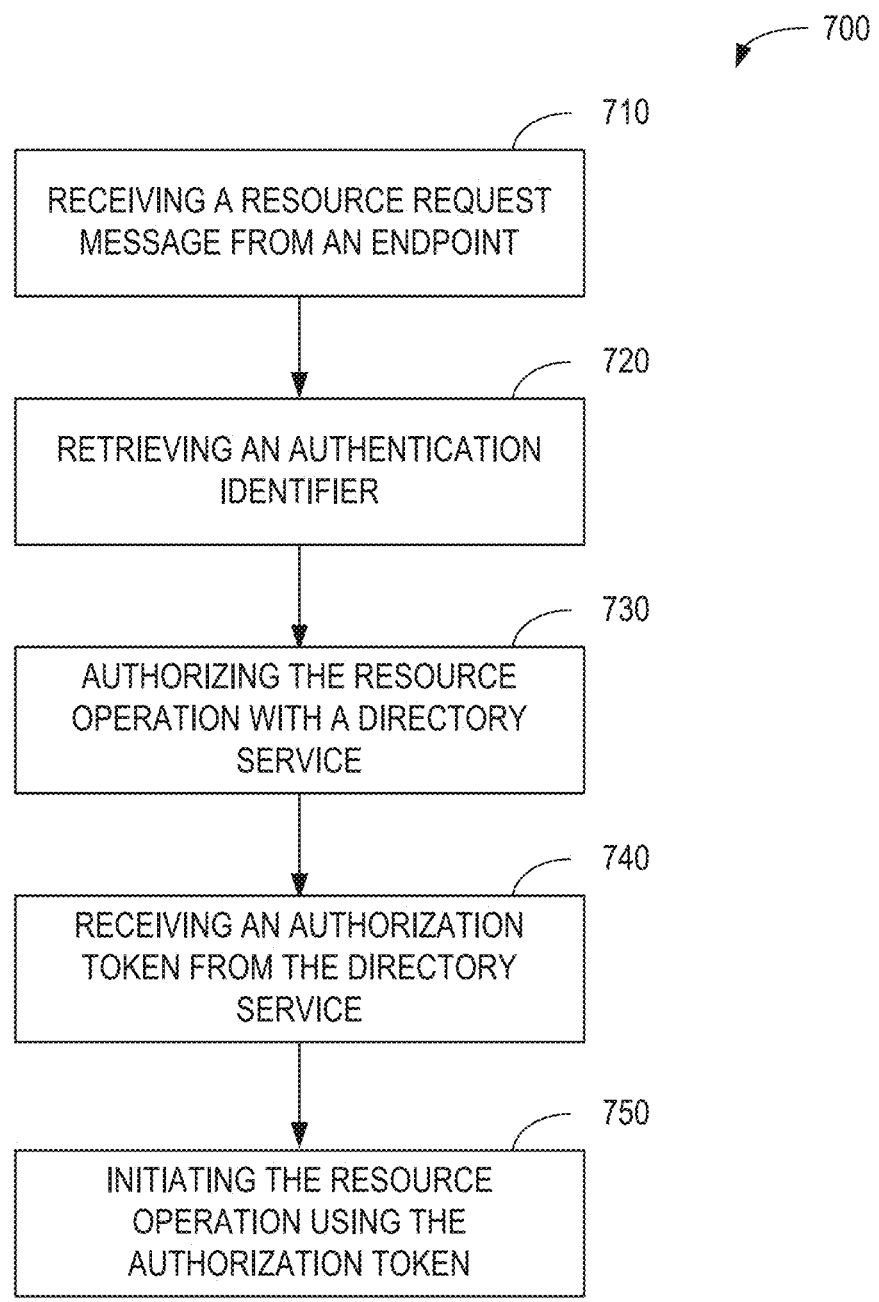
FIG. 7 is a flowchart illustrating an example method for pass-through impersonation of a user such as the user shown in FIG. 1.

FIG. 7 is a flowchart illustrating an example method 700 for pass-through impersonation of a user such as the user 113 shown in FIG. 1. In the example embodiment, the method 700 is performed by a computing device including a processor and memory which may be similar to the gateway 108, or a machine 1000, or by a software architecture. In some embodiments, the method is performed by a gateway device residing in an internal network such as enterprise network 105, wherein the endpoint resides in an external network, such as the communications network 116, separated from the internal network such that the endpoint is restricted from performing the authentication request directly with a directory service.

In operation 710, the method 700 includes receiving a resource request message from an endpoint associated with a user, the resource request message including an external token, a resource operation, and a resource identifier. In some embodiments, the resource request message is an application program interface (API) message formatted as a hypertext transfer protocol (HTTP) representational state transfer (REST) message. In operation 720, the method 700 includes retrieving, from the memory, an authentication identifier associated with one of the endpoint and the user based on the external token. In some embodiments, the authentication identifier is a Ticket to Grant Tickets (TGT), wherein authorizing the resource operation with the directory service further includes transmitting the TGT to the directory service, and the method further includes receiving a service ticket from the directory service.

At operation 730, the method 700 further includes authorizing the resource operation with a directory service using the authentication identifier. At operation 740, the method 700 also includes receiving an authorization token from the directory service. At operation 750, the method further includes initiating the resource operation with an internal resource using the authorization token.

In some embodiments, the method 700 also includes providing multiple resource controllers for multiple resource types, each resource controller of multiple resource controllers is configured to initiate resource operations on a particular type of internal resource, determining a first resource type based on the resource request message, and identifying a first resource controller from the multiple resource controllers based on the first resource type, wherein the identified first resource controller is associated with the first resource type, and wherein the internal resource is of the first resource type.

In some embodiments, the method 700 further includes defining multiple application program interface (API) calls, each API call of the multiple API calls including an input schema and an output schema, wherein the resource request message is formatted based on the input schema, receiving response data from the internal resource based on initiating the resource operation, constructing a response message formatted based on the output schema and including the response data, and transmitting the response message to the endpoint.

In some embodiments, the method 700 also includes performing a second layer authorization of the resource operation based on permissions associated with the user within a secondary user system, wherein the second layer authorization is configured to restrict at least one resource operation for the user that is authorized by the directory service.

Figure 8:
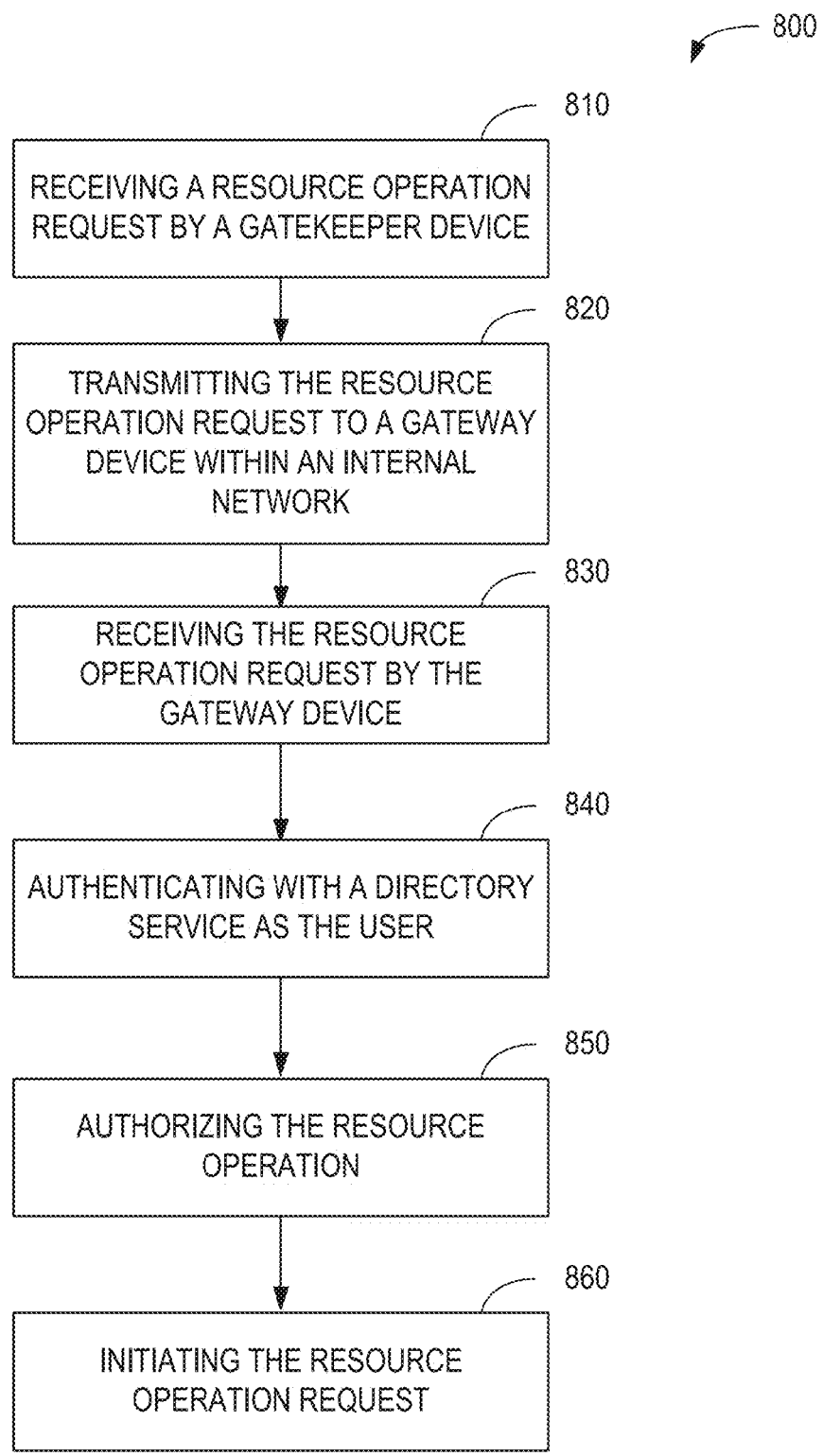
FIG. 8 is a flowchart illustrating an example method for enabling an endpoint residing in an external network to perform resource operations on an internal resource.

FIG. 8 is a flowchart illustrating an example method 800 for enabling an endpoint residing in an external network to perform resource operations on an internal resource. In the example embodiment, the method 800 is performed by one or more computing devices, each including a processor and memory, which may be similar to the gateway 108, gatekeeper 110, directory service 118, endpoint 101, or a machine 1000, or by a software architecture. In some embodiments, the method is performed by a gateway device residing in an internal network such as enterprise network 105, and a gatekeeper device residing in an external network such as communications network 116, wherein the endpoint resides in the external network, which is separated from the internal network such that the endpoint is restricted from performing the authentication request directly with a directory service.

In operation 810, the method 800 includes receiving, by a gatekeeper device residing in an external network, a resource operation request from the endpoint, the resource operation request is associated with a user. In some embodiments, receiving, by the gatekeeper device, the resource operation request further includes receiving the resource operation request through a web service, and the method 800 further includes reformatting the resource operation request into an application program interface (API) format prior to transmitting the resource operation request to the gateway device. In some embodiments, the resource operation request is an application program interface (API) message formatted as a hypertext transfer protocol (HTTP) representational state transfer (REST) message.

In operation 820, the method 800 includes transmitting the resource operation request from the gatekeeper device to a gateway device residing in an internal network. In operation 830, the method 800 includes receiving, by the gateway device, the resource operation request.

In operation 840, the method 800 includes authenticating with a directory service as the user, using credentials of the user. In some embodiments, authenticating further includes receiving, by the gateway device, an internal token associated with the user, and the method further includes authorizing the resource operation request using the internal token associated with the user.

In operation 850, the method 800 includes authorizing the resource operation request with the directory service. In operation 860, the method 800 includes initiating the resource operation request with the internal resource.

In some embodiments, the resource operation request includes a domain name, and the method further includes selecting, by the gatekeeper device, the gateway device from multiple gateways based on the domain name, wherein transmitting the resource operation request to the gateway device is based on the selecting. In some embodiments, the method also includes establishing a first connection from the gateway device to the gatekeeper device, wherein the first connection is initially unused, using the first connection, by the gatekeeper device, to transmit the resource operation request to the gateway device, and establishing a second connection from the gateway device to the gatekeeper device based on the using the first connection. In some embodiments, the method 800 further includes generating an external token associated with the endpoint, associating the external token with the internal token, and identifying the internal token for use in the authorizing after receiving the resource operation request.

Software Architecture

It should be noted that the present disclosure can be carried out as a method and embodied in a system. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described in conjunction with FIGS. 1-5 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the systems and methods described herein in different contexts from this disclosure.

Figure 9:
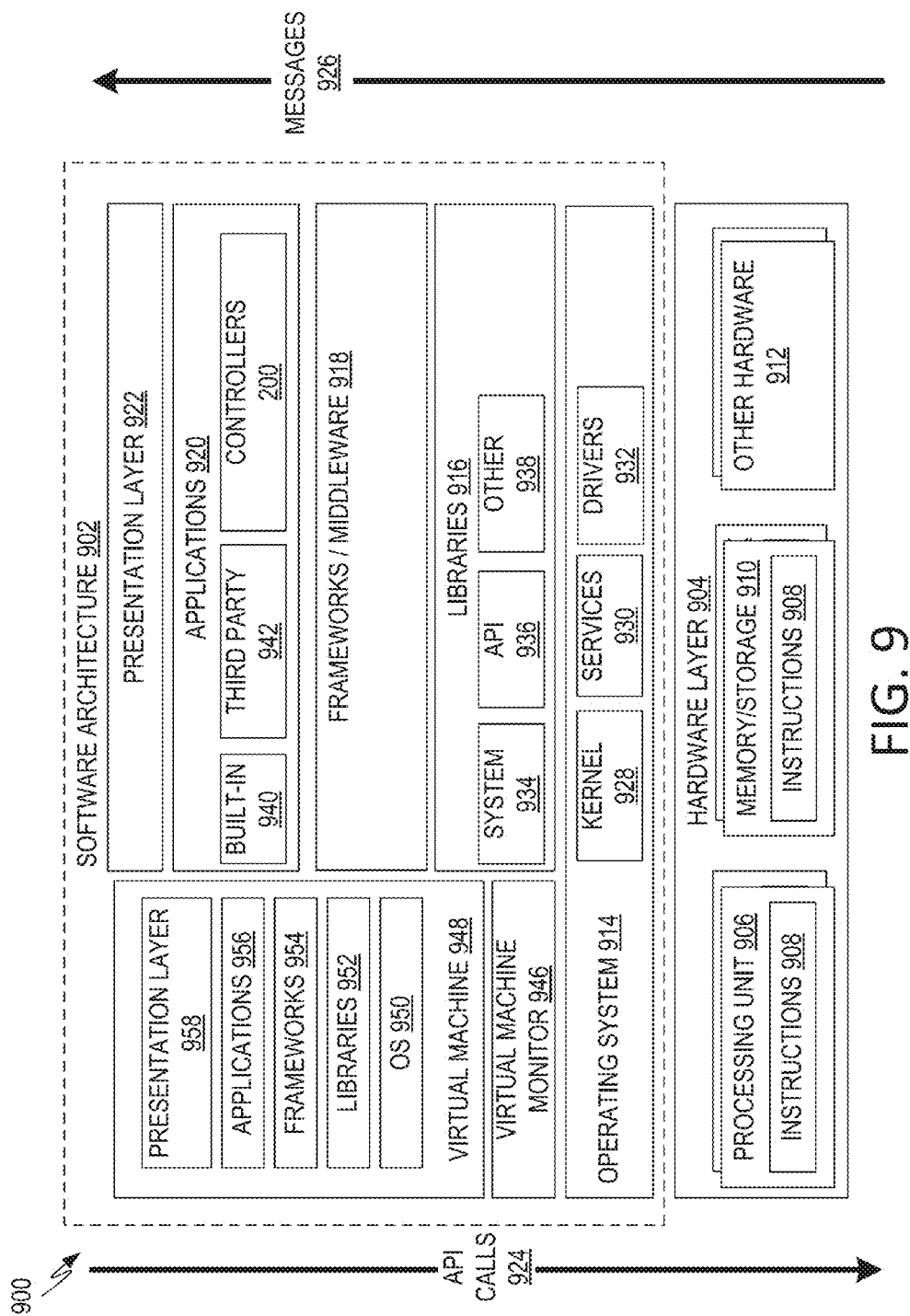
FIG. 9 is a block diagram illustrating a representative software architecture, which may be used in conjunction with various hardware architectures described herein to provide the Resource Access System, or any of the various components thereof, described herein (e.g., the gatekeeper, the gateway, the directory service, the endpoint, all shown in FIG. 1).

FIG. 9 is a block diagram 900 illustrating a representative software architecture 902, which may be used in conjunction with various hardware architectures described herein to provide the Resource Access System 100, or any of the various components thereof (e.g., the gatekeeper 110, the gateway 108, the directory service 118, the endpoint 101), described herein. FIG. 9 is merely a non-limiting example of a software architecture and it will be appreciated that many other architectures may be implemented to facilitate the functionality described herein. The software architecture 902 may be executing on hardware such as machine 1000 of FIG. 10 that includes, among other things, processors 1010, memory 1030, and I/O components 1050. A representative hardware layer 904 is illustrated and can represent, for example, the machine 1000 of FIG. 10. The representative hardware layer 904 comprises one or more processing units 906 having associated executable instructions 908. Executable instructions 908 represent the executable instructions of the software architecture 902, including implementation of the methods, modules and so forth of FIGS. 1-8. Hardware layer 904 also includes memory and/or storage modules 910, which also have executable instructions 908. Hardware layer 904 may also comprise other hardware as indicated by 912 which represents any other hardware of the hardware layer 904, such as the other hardware illustrated as part of machine 1000.

In the example architecture of FIG. 9, the software 902 may be conceptualized as a stack of layers where each layer provides particular functionality. For example, the software 902 may include layers such as an operating system 914, libraries 916, frameworks/middleware 918, applications 920 and presentation layer 922. Operationally, the applications 920 and/or other components within the layers may invoke application programming interface (API) calls 924 through the software stack and receive a response, returned values, and so forth illustrated as messages 926 in response to the API calls 924. The layers illustrated are representative in nature and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 may provide a common infrastructure that may be used by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system 934 libraries (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) may provide a higher-level common infrastructure that may be used by the applications 920 and/or other software components/modules. For example, the frameworks 918 may provide various graphic user interface (GUI) functions, high-level resource management, high-level location services, and so forth. The frameworks 918 may provide a broad spectrum of other APIs that may be used by the applications 920 and/or other software components/modules, some of which may be specific to a particular operating system or platform.

The applications 920 include built-in applications 940 and/or third party applications 942. Examples of representative built-in applications 940 may include, but are not limited to, a contacts application, a browser application, a book reader application, a location application, a media application, a messaging application, an endpoint application, one or more controllers 200, a directory service 118, gateway 108 applications, gatekeeper 110 applications, and/or a game application. Third party applications 942 may include any of the built in applications as well as a broad assortment of other applications. In a specific example, the third party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 942 may invoke the API calls 924 provided by the mobile operating system such as operating system 914 to facilitate functionality described herein.

The applications 920 may use built in operating system functions (e.g., kernel 928, services 930 and/or drivers 932), libraries (e.g., system 934, APIs 936, and other libraries 938), frameworks/middleware 918 to create user interfaces to interact with users of the system. Alternatively, or additionally, in some systems interactions with a user may occur through a presentation layer, such as presentation layer 922. In these systems, the application/module "logic" can be separated from the aspects of the application/module that interact with a user.

Some software architectures use virtual machines. In the example of FIG. 9, this is illustrated by virtual machine 948. A virtual machine creates a software environment where applications/modules can execute as if they were executing on a hardware machine (such as the machine of FIG. 10, for example). A virtual machine is hosted by a host operating system (operating system 914 in FIG. 9) and typically, although not always, has a virtual machine monitor 946, which manages the operation of the virtual machine as well as the interface with the host operating system (i.e., operating system 914). A software architecture executes within the virtual machine such as an operating system 950, libraries 952, frameworks/middleware 954, applications 956 and/ or presentation layer 958. These layers of software architecture executing within the virtual machine 948 can be the same as corresponding layers previously described or may be different.

In the example embodiment, the controllers 200 operate as an application(s) in the applications 920 layer. However, in some embodiments, the controllers 200 may operate in other software layers, or in multiple software layers (e.g., framework 918 and application 920), or in any architecture that enables the systems and methods as described herein.

Figure 10:
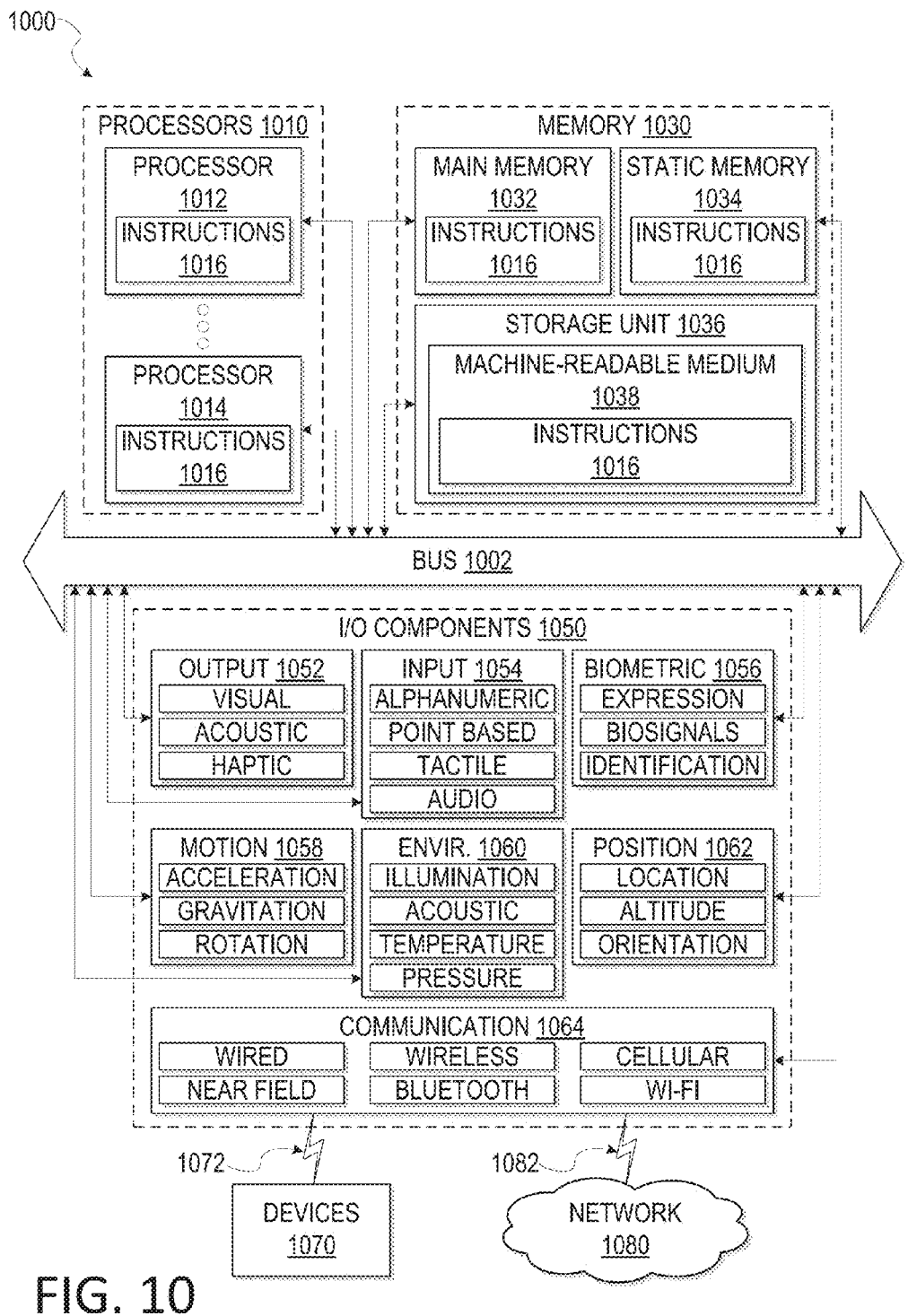
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions from a machine-readable medium 1038 (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. The instructions transform the general, non-programmed machine into a particular machine programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1012 and processor 1014 that may execute instructions 1016. The term "processor" is intended to include multi-core processor that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core process), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of processors 1010 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes transitory signals per se.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., displays such as a plasma display panel (PDP), a light emitting diode (LED) display, a liquid crystal display (LCD), a projector, a cathode ray tube (CRT), or wearable devices such as head-mounted display (HMD) devices), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), motion-sensing input components (e.g., hand controllers), audio input components (e.g., a microphone), and the like.

In further example embodiments, the I/O components 1050 may include biometric components 1056, motion components 1058, environmental components 1060, or position components 1062 among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), position-sensing components, and so forth. The environmental components 1060 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via coupling 1082 and coupling 1072 respectively. For example, the communication components 1064 may include a network interface component or other suitable device to interface with the network 1080. In further examples, communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or other type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 may be transmitted or received over the network 1080 using a transmission medium via a network interface device (e.g., a network interface component included in the communication components 1064) and using any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to devices 1070. The term "transmission medium" shall be taken to include any intangible medium that is capable of storing, encoding, or carrying instructions 1016 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system for enabling an endpoint residing in an external network to perform resource operations on an internal resource, the endpoint is a computing device associated with a user, the system comprising:
    a directory service managing authentication and authorization operations for the internal resource;
    a gatekeeper device residing in the external network; and
    a gateway device residing in an internal network,
    the gatekeeper device is configured to:
        receive a resource operation request from the endpoint, the resource operation request is associated with the user, the resource operation request including credentials of the user; and
        transmit the resource operation request to the gateway device, the gateway device is configured to:
            receive the resource operation request from the gatekeeper device;
            authenticate with the directory service as the user, using credentials of the user;
            receive an internal token associated with the user from the directory service based on authentication by the directory service;
            authorize the resource operation request, using the internal token received from the directory service, with the directory service as the user, the gateway device impersonating the user using the internal token; and
            initiate the resource operation request with the internal resource.

2. The system of claim 1, wherein the resource operation request includes a domain name, wherein the gatekeeper device is further configured to select the gateway device from a plurality of gateways based on the domain name, wherein transmitting the resource operation request to the gateway device is based on the selecting.

3. The system of claim 1, wherein the gatekeeper device is further configured to:
    receive the resource operation request through a web service; and
    reformat the resource operation request into an application program interface (API) format prior to transmitting the resource operation request to the gateway device.

4. The system of claim 1 further comprising:
    a network address translation traversal (NAT-T) client; and
    a NAT-T server, wherein the NAT-T client is configured to establish a first connection to the NAT-T server, the first connection is initially unused, wherein the gatekeeper device is configured to use the first connection to communicate the resource operation request to the gateway, wherein the NAT-T client is configured to establish a second connection to the NAT-T server when the first connection becomes used by the gatekeeper device.

5. The system of claim 1, wherein the resource operation request is an application program interface (API) message formatted as a hypertext transfer protocol (HTTP) representational state transfer (REST) message.

6. The system of claim 1, wherein the directory service is configured to generate the internal token associated with the user during the authentication.

7. The system of claim 6, wherein the gateway device is further configured to:
    generate an external token associated with the endpoint;
    associate the external token with the internal token; and
    identify the internal token for use in the authorizing after receiving the resource operation request without receiving the internal token from the endpoint.

8. A method for enabling an endpoint residing in an external network to perform resource operations on an internal resource, the endpoint is a computing device associated with a user, the method comprising:
    receiving, by a gatekeeper device residing in an external network, a resource operation request from the endpoint, the resource operation request is associated with the user, the resource operation request including credentials of the user;
    transmitting the resource operation request from the gatekeeper device to a gateway device residing in an internal network;
    receiving, by the gateway device, the resource operation request;
    authenticating with a directory service as the user, using credentials of the user;
    receiving an internal token associated with the user from the directory service based on authentication by the directory service;
    authorizing the resource operation request, using the internal token received from the directory service, with the directory service as the user, the gateway device impersonating the user using the internal token; and
    initiating the resource operation request with the internal resource.

9. The method of claim 8, wherein the resource operation request includes a domain name, the method further comprising selecting, by the gatekeeper device, the gateway device from a plurality of gateways based on the domain name, wherein transmitting the resource operation request to the gateway device is based on the selecting.

10. The method of claim 8, wherein receiving the resource operation request further includes receiving the resource operation request through a web service, the method further comprising reformatting the resource operation request into an application program interface (API) format prior to transmitting the resource operation request to the gateway device.

11. The method of claim 8 further comprising:
establishing a first connection from the gateway device to the gatekeeper device, wherein the first connection is initially unused;
using the first connection, by the gatekeeper device, to transmit the resource operation request to the gateway device; and
establishing a second connection from the gateway device to the gatekeeper device based on the using the first connection.

12. The method of claim 8, wherein the resource operation request is an application program interface (API) message formatted as a hypertext transfer protocol (HTTP) representational state transfer (REST) message.

13. The method of claim 8, further comprising:
generating an external token associated with the endpoint;
associating the external token with the internal token; and
identifying the internal token for use in the authorizing after receiving the resource operation request without receiving the internal token from the endpoint.

14. A non-transitory machine-readable storage medium storing a set of instructions that, when executed by at least one processor, causes the at least one processor to perform operations comprising:
receiving, by a gatekeeper device residing in an external network, a resource operation request from an endpoint residing in an external network, the resource operation request is associated with a user, the endpoint is a computing device associated with the user, the resource operation request including credentials of the user;
transmitting the resource operation request from the gatekeeper device to a gateway device residing in an internal network;
receiving, by the gateway device, the resource operation request;
authenticating with a directory service as the user, using credentials of the user;
receiving an internal token associated with the user from the directory service based on authentication by the directory service;
authorizing the resource operation request, using the internal token received from the directory service, with the directory service as the user, the gateway device impersonating the user using the internal token; and
initiating the resource operation request with the internal resource.

15. The non-transitory machine-readable medium of claim 14, wherein the resource operation request includes a domain name, the operations further comprising selecting, by the gatekeeper device, the gateway device from a plurality of gateways based on the domain name, wherein transmitting the resource operation request to the gateway device is based on the selecting.

16. The non-transitory machine-readable medium of claim 14, wherein receiving the resource operation request further includes receiving the resource operation request through a web service, the operations further comprising reformatting the resource operation request into an application program interface (API) format prior to transmitting the resource operation request to the gateway device.

17. The non-transitory machine-readable medium of claim 14, the operations further comprising:
establishing a first connection from the gateway device to the gatekeeper device, wherein the first connection is initially unused;
using the first connection, by the gatekeeper device, to transmit the resource operation request to the gateway device; and
establishing a second connection from the gateway device to the gatekeeper device based on the using the first connection.

18. The non-transitory machine-readable medium of claim 14, wherein the resource operation request is an application program interface (API) message formatted as a hypertext transfer protocol (HTTP) representational state transfer (REST) message.

19. The non-transitory machine-readable medium of claim 14, the operations further comprising:
generating an external token associated with the endpoint;
associating the external token with the internal token; and
identifying the internal token for use in the authorizing after receiving the resource operation request without receiving the internal token from the endpoint.

* * * * *